US012497644B2

United States Patent
Nuijens et al.

(10) Patent No.: US 12,497,644 B2
(45) Date of Patent: Dec. 16, 2025

(54) SUBTILISIN VARIANTS AND THEIR USE

(71) Applicant: FRESENIUS KABI IPSUM S.R.L., Cassina de' Pecchi—Milano (IT)

(72) Inventors: Timo Nuijens, Geleen (NL); Jurgen Mateman, Geleen (NL); Rowin De Visser, Geleen (NL); Walter Cabri, Cassina de' Pecchi—Milano (IT); Kerstin Wallraven, Geleen (NL); Elvira Wijker, Geleen (NL); Antonio Ricci, Cassina de' Pecchi—Milano (IT); Ana Toplak, Geleen (NL)

(73) Assignee: FRESENIUS KABI IPSUM S.R.L., Milan (IT)

( * ) Notice: Subject to any disclaimer, the term of this patent is extended or adjusted under 35 U.S.C. 154(b) by 149 days.

(21) Appl. No.: 18/264,101

(22) PCT Filed: Feb. 9, 2022

(86) PCT No.: PCT/EP2022/053121
§ 371 (c)(1),
(2) Date: Aug. 3, 2023

(87) PCT Pub. No.: WO2022/171667
PCT Pub. Date: Aug. 18, 2022

(65) Prior Publication Data
US 2024/0043897 A1  Feb. 8, 2024

(30) Foreign Application Priority Data

Feb. 12, 2021  (EP) .................................... 21156989
May 26, 2021  (EP) .................................... 21176039

(51) Int. Cl.
*C12P 21/02* (2006.01)
*C12N 9/54* (2006.01)

(52) U.S. Cl.
CPC ............ *C12P 21/02* (2013.01); *C12N 9/54* (2013.01); *C12Y 304/21062* (2013.01)

(58) Field of Classification Search
None
See application file for complete search history.

(56) References Cited

U.S. PATENT DOCUMENTS

| | | | |
|---|---|---|---|
| 5,403,737 A | | 4/1995 | Abrahmsen et al. |
| 5,955,340 A | * | 9/1999 | Bott .................. C11D 3/386 |
| | | | 435/252.31 |
| 2011/0251073 A1 | * | 10/2011 | Cascao-Pereira .... A23K 20/189 |
| | | | 435/23 |

FOREIGN PATENT DOCUMENTS

| | | | |
|---|---|---|---|
| WO | 9949057 A1 | | 9/1999 |
| WO | 0226956 A1 | | 4/2002 |
| WO | 2010056640 A2 | | 5/2010 |
| WO | WO 2016/056913 | * | 4/2016 |
| WO | 2018212658 A1 | | 11/2018 |
| WO | 2019170918 A1 | | 9/2019 |
| WO | WO 2019/170895 | * | 9/2019 |

OTHER PUBLICATIONS

Folz et al., "Substrate Specificity of Eukaryotic Signal Peptidase", J. Biol. Chem., 1988, vol. 263, No. 4, pp. 2070-2078.*
Airaksinen et al., "Modified Base Compositions at Degenerate Positions of a Mutagenic Oligonucleotide Enhance Randomness in Site-Saturation Mutagenesis", Nucleic Acids Research, 1998, vol. 26, No. 2, pp. 576-581.*
Siloto et al., "Site saturation mutagenesis: Methods and applications in protein engineering", Biocatalysis and Agricultural Biotechnology, 2012, vol. 1, pp. 181-189.*
Thomas et al., "Tailoring the pH dependence of enzyme catalysis using protein engineering", Nature, 1985, vol. 318, No. 28, pp. 375-376.*
International Search Report and Written Opinion for Corresponding International Application No. PCT/EP2022/053121, 12 pages, May 19, 2022.
Nuijens et al., "Natural Occurring and Engineered Enzymes for Peptide Ligation and Cyclization", Frontiers in Chemistry, 2019, vol. 7, pp. 1-8.

* cited by examiner

*Primary Examiner* — Suzanne M Noakes
(74) *Attorney, Agent, or Firm* — Lucas & Mercanti, LLP

(57) ABSTRACT

The invention relates to a subtilisin BPN' variant or homologue thereof, having new mutations compared to subtilisin BPN' represented by SEQ ID NO: 2 or a homologue sequence thereof. Such mutations may occur at amino acid positions L96, D99, A223 or S224. The invention further relates to a method for enzymatically synthesizing a peptide by coupling peptide fragments, wherein the coupling is catalyzed by the subtilisin BPN' variant or homologue thereof.

22 Claims, No Drawings
Specification includes a Sequence Listing.

SEQUENCE LISTING

<160> NUMBER OF SEQ ID NOS: 45

<210> SEQ ID NO 1
<211> LENGTH: 1149
<212> TYPE: DNA
<213> ORGANISM: Bacillus amyloliquefaciens

<400> SEQUENCE: 1

```
gtgagaggca aaaagtatg  gatcagtttg ctgtttgctt tagcgttaat ctttacgatg      60
gcgttcggca gcacatcctc tgcccaggcg gcagggaaat caaacgggga aagaaatat     120 attgtcgggt ttaaacagac aatgagcacg atgagcgccg ctaagaagaa agatgtcatt    180
tctgaaaaag gcgggaaagt gcaaaagcaa ttcaaatatg tagacgcagc ttcagctaca    240
ttaaacgaaa aagctgtaaa agaattgaaa aagacccga gcgtcgctta cgttgaagaa    300
gatcacgtag cacatgcgta cgcgcagtcc gtgccttacg gcgtatcaca aattaaagcc    360
```

```
cctgctctgc actctcaagg ctacactgga tcaaatgtta aagtagcggt tatcgacagc    420
ggtatcgatt cttctcatcc tgatttaaag gtagcaggcg gagccagcat ggttccttct    480
gaaacaaatc ctttccaaga caacaactct cacggaactc acgttgccgg cacagttgcg    540
gctcttaata actcaatcgg tgtattaggc gttgcgccaa gcgcatcact ttacgctgta    600
aaagttctcg gtgctgacgg ttccggccaa tacagctgga tcattaacgg aatcgagtgg    660
gcgatcgcaa acaatatgga cgttattaac atgagcctcg gcggaccttc tggttctgct    720 gcttttaaaag cggcagttga taaagccgtt gcatccggcg tcgtagtcgt tgcggcagcc    780
ggtaacgaag gcacttccgg cagctcaagc acagtgggct accctggtaa atacccttct    840
gtcattgcag taggcgctgt tgacagcagc aaccaaagag catctttctc aagcgtagga    900
cctgagcttg atgtcatggc acctggcgta tctatccaaa gcacgcttcc tggaaacaaa    960
tacggggcgt acaacggtac gtcaatggca tctccgcacg ttgccggagc ggctgctttg   1020 attcttttcta agcacccgaa ctggacaaac actcaagtcc gcagcagttt agaaaacacc   1080
actacaaaac ttggtgattc tttctactat ggaaaagggc tgatcaacgt acaggcggca   1140
gctcagtaa                                                           1149
```

<210> SEQ ID NO 2
<211> LENGTH: 275
<212> TYPE: PRT
<213> ORGANISM: Bacillus amyloliquefaciens

<400> SEQUENCE: 2

```
Ala Gln Ser Val Pro Tyr Gly Val Ser Gln Ile Lys Ala Pro Ala Leu
 1               5                  10                  15

His Ser Gln Gly Tyr Thr Gly Ser Asn Val Lys Val Ala Val Ile Asp
            20                  25                  30

Ser Gly Ile Asp Ser Ser His Pro Asp Leu Lys Val Ala Gly Gly Ala
        35                  40                  45

Ser Met Val Pro Ser Glu Thr Asn Pro Phe Gln Asp Asn Asn Ser His
    50                  55                  60

Gly Thr His Val Ala Gly Thr Val Ala Ala Leu Asn Asn Ser Ile Gly
65                  70                  75                  80

Val Leu Gly Val Ala Pro Ser Ala Ser Leu Tyr Ala Val Lys Val Leu
                85                  90                  95

Gly Ala Asp Gly Ser Gly Gln Tyr Ser Trp Ile Ile Asn Gly Ile Glu
            100                 105                 110

Trp Ala Ile Ala Asn Asn Met Asp Val Ile Asn Met Ser Leu Gly Gly
        115                 120                 125

Pro Ser Gly Ser Ala Ala Leu Lys Ala Ala Val Asp Lys Ala Val Ala
    130                 135                 140

Ser Gly Val Val Val Ala Ala Ala Gly Asn Glu Gly Thr Ser Gly
145                 150                 155                 160

Ser Ser Ser Thr Val Gly Tyr Pro Gly Lys Tyr Pro Ser Val Ile Ala
                165                 170                 175

Val Gly Ala Val Asp Ser Ser Asn Gln Arg Ala Ser Phe Ser Ser Val
            180                 185                 190

Gly Pro Glu Leu Asp Val Met Ala Pro Gly Val Ser Ile Gln Ser Thr
        195                 200                 205

Leu Pro Gly Asn Lys Tyr Gly Ala Tyr Asn Gly Thr Ser Met Ala Ser
    210                 215                 220
```

```
Pro His Val Ala Gly Ala Ala Leu Ile Leu Ser Lys His Pro Asn
225                 230                 235                 240

Trp Thr Asn Thr Gln Val Arg Ser Ser Leu Glu Asn Thr Thr Lys
            245                 250                 255

Leu Gly Asp Ser Phe Tyr Tyr Gly Lys Gly Leu Ile Asn Val Gln Ala
        260                 265                 270

Ala Ala Gln
        275
```

<210> SEQ ID NO 3
<211> LENGTH: 272
<212> TYPE: PRT
<213> ORGANISM: Artificial Sequence
<220> FEATURE:
<223> OTHER INFORMATION: subtilisin BPN' variant of the invention
<220> FEATURE:
<221> NAME/KEY: VARIANT
<222> LOCATION: (87)..(87)
<223> OTHER INFORMATION: L96 position
<220> FEATURE:
<221> NAME/KEY: VARIANT
<222> LOCATION: (90)..(90)
<223> OTHER INFORMATION: D99 position
<220> FEATURE:
<221> NAME/KEY: VARIANT
<222> LOCATION: (214)..(214)
<223> OTHER INFORMATION: A223 position
<220> FEATURE:
<221> NAME/KEY: VARIANT
<222> LOCATION: (215)..(215)
<223> OTHER INFORMATION: S224 position

<400> SEQUENCE: 3

```
Ala Gln Ser Val Pro Tyr Gly Val Ser Gln Ile Lys Ala Pro Ala Leu
1               5                   10                  15

His Ser Gln Gly Tyr Thr Gly Ser Asn Val Lys Val Ala Val Ile Asp
            20                  25                  30

Ser Gly Ile Asp Ser Ser His Pro Asp Leu Lys Val Ala Gly Gly Ala
        35                  40                  45

Ser Met Val Pro Ser Glu Thr Asn Pro Phe Gln Asp Asn Asn Ser His
50                  55                  60

Gly Thr His Val Ala Gly Thr Val Ala Ala Val Ala Pro Ser Ala Ser
65                  70                  75                  80

Leu Tyr Ala Val Lys Val Xaa Gly Ala Xaa Gly Ser Gly Gln Tyr Ser
            85                  90                  95

Trp Ile Ile Asn Gly Ile Glu Trp Ala Ile Ala Asn Asn Met Asp Val
            100                 105                 110

Ile Asn Met Ser Leu Gly Gly Pro Ser Gly Ser Ala Ala Leu Lys Ala
            115                 120                 125

Ala Val Asp Lys Ala Val Ala Ser Gly Val Val Val Val Ala Ala Ala
        130                 135                 140

Gly Asn Glu Gly Thr Ser Gly Ser Ser Ser Thr Val Gly Tyr Pro Gly
145                 150                 155                 160

Lys Tyr Pro Ser Val Ile Ala Val Gly Ala Val Asp Ser Ser Asn Gln
            165                 170                 175

Arg Ala Ser Phe Ser Ser Val Gly Pro Glu Leu Asp Val Met Ala Pro
            180                 185                 190

Gly Val Ser Ile Gln Ser Thr Leu Pro Gly Asn Lys Tyr Gly Ala Tyr
        195                 200                 205

Asn Gly Thr Cys Met Xaa Xaa Pro His Val Ala Gly Ala Ala Ala Leu
    210                 215                 220
```

```
Ile Leu Ser Lys His Pro Asn Trp Thr Asn Thr Gln Val Arg Ser Ser
225                 230                 235                 240

Leu Glu Asn Thr Thr Thr Lys Leu Gly Asp Ser Phe Tyr Tyr Gly Lys
            245                 250                 255

Gly Leu Ile Asn Val Gln Ala Ala Gln His His His His His His
            260                 265                 270
```

<210> SEQ ID NO 4
<211> LENGTH: 272
<212> TYPE: PRT
<213> ORGANISM: Artificial Sequence
<220> FEATURE:
<223> OTHER INFORMATION: Reference enzyme Ptl-84

<400> SEQUENCE: 4

```
Ala Lys Cys Val Ser Tyr Gly Val Ala Gln Ile Lys Ala Pro Ala Leu
1               5                   10                  15

His Ser Gln Gly Tyr Thr Gly Ser Asn Val Lys Val Ala Val Leu Asp
            20                  25                  30

Ser Gly Ile Asp Ser Ser His Pro Asp Leu Asn Val Ala Gly Gly Ala
        35                  40                  45

Ser Phe Val Pro Ser Glu Thr Asn Pro Phe Gln Asp Asn Ala Ser His
50                  55                  60

Gly Thr His Val Ala Gly Thr Val Leu Ala Val Ala Pro Ser Ala Ser
65                  70                  75                  80

Leu Tyr Ala Val Lys Val Leu Gly Ala Asp Gly Ser Gly Gln Tyr Ser
                85                  90                  95

Trp Ile Ile Asn Gly Ile Glu Trp Ala Ile Ala Asn Asn Met Asp Val
            100                 105                 110

Ile Asn Met Ser Leu Gly Gly Pro Ser Gly Ser Ala Ala Leu Lys Ala
            115                 120                 125

Ala Val Asp Lys Ala Val Ala Ser Gly Val Val Val Ala Ala Ala
130                 135                 140

Gly Asn Asn Gly Thr Ser Gly Ser Ser Ser Thr Val Glu Tyr Pro Ala
145                 150                 155                 160

Lys Tyr Pro Ser Val Ile Ala Val Gly Ala Val Asp Ser Ser Asn Gln
                165                 170                 175

Arg Ala Pro Trp Ser Ser Val Gly Pro Glu Leu Asp Val Met Ala Pro
            180                 185                 190

Gly Val Ser Ile Cys Ser Thr Leu Pro Gly Gly Lys Tyr Gly Ala His
            195                 200                 205

Asp Gly Thr Cys Pro Ala Ser Asn His Val Ala Gly Ala Ala Ala Leu
210                 215                 220

Ile Leu Ser Lys His Pro Asn Trp Thr Asn Thr Gln Val Arg Ser Ser
225                 230                 235                 240

Leu Glu Asn Thr Ala Thr Lys Leu Gly Asp Ser Phe Tyr Tyr Gly Lys
            245                 250                 255

Gly Leu Ile Asn Val Glu Ala Ala Gln His His His His His His
            260                 265                 270
```

<210> SEQ ID NO 5
<211> LENGTH: 272
<212> TYPE: PRT
<213> ORGANISM: Artificial Sequence
<220> FEATURE:
<223> OTHER INFORMATION: Reference enzyme Ptl-79

```
<400> SEQUENCE: 5

Ala Lys Cys Val Ser Tyr Gly Val Ala Gln Ile Lys Ala Pro Ala Leu
1               5                   10                  15

His Ser Gln Gly Tyr Thr Gly Ser Asn Val Lys Val Ala Val Leu Asp
            20                  25                  30

Ser Gly Ile Asp Ser Ser His Pro Asp Leu Asn Val Ala Gly Gly Ala
        35                  40                  45

Ser Phe Val Pro Ser Glu Thr Asn Pro Phe Gln Asp Asn Asn Ser His
    50                  55                  60

Gly Thr His Val Ala Gly Thr Val Leu Ala Val Ala Pro Ser Ala Ser
65                  70                  75                  80

Leu Tyr Ala Val Lys Val Leu Gly Ala Asp Gly Ser Gly Gln Tyr Ser
                85                  90                  95

Trp Val Ile Asn Gly Ile Glu Trp Ala Ile Ala Asn Asn Met Asp Val
            100                 105                 110

Ile Asn Met Ser Leu Gly Gly Pro Ser Gly Ser Ala Ala Leu Lys Ala
        115                 120                 125

Ala Val Asp Lys Ala Val Ala Ser Gly Val Val Val Ala Ala Ala
130                 135                 140

Gly Asn Ser Gly Thr Ser Gly Ser Ser Ser Thr Val Ser Tyr Pro Ala
145                 150                 155                 160

Lys Tyr Pro Ser Val Ile Ala Val Gly Ala Val Asp Ser Ser Asn Gln
                165                 170                 175

Arg Ala Pro Trp Ser Ser Val Gly Pro Glu Leu Asp Val Met Ala Pro
            180                 185                 190

Gly Val Ser Ile Cys Ser Thr Leu Pro Gly Gly Lys Tyr Gly Ala His
        195                 200                 205

Ser Gly Thr Cys Pro Ala Ser Asn His Val Ala Gly Ala Ala Ala Leu
    210                 215                 220

Ile Leu Ser Lys His Pro Asn Trp Thr Asn Thr Gln Val Arg Ser Ser
225                 230                 235                 240

Leu Glu Asn Thr Ala Thr Lys Leu Gly Asp Ser Phe Tyr Tyr Gly Lys
                245                 250                 255

Gly Leu Ile Asn Val Glu Ala Ala Gln His His His His His His
            260                 265                 270

<210> SEQ ID NO 6
<211> LENGTH: 31
<212> TYPE: PRT
<213> ORGANISM: Artificial Sequence
<220> FEATURE:
<223> OTHER INFORMATION: liraglutide
<220> FEATURE:
<221> NAME/KEY: MOD_RES
<222> LOCATION: (20)..(20)
<223> OTHER INFORMATION: Lys is Lys(Pal-gamma-Glu)

<400> SEQUENCE: 6

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 7
<211> LENGTH: 31
<212> TYPE: PRT
<213> ORGANISM: Artificial Sequence
<220> FEATURE:
```

```
<223> OTHER INFORMATION: semaglutide
<220> FEATURE:
<221> NAME/KEY: MOD_RES
<222> LOCATION: (2)..(2)
<223> OTHER INFORMATION: Aib
<220> FEATURE:
<221> NAME/KEY: MOD_RES
<222> LOCATION: (20)..(20)
<223> OTHER INFORMATION: Lys is Lys(AEEA-AEEA-gamma-Glu-17-
      carboxyheptadecanoyl)

<400> SEQUENCE: 7

His Xaa Glu Gly Thr Phe Thr Ser Asp Val Ser Ser Tyr Leu Glu Gly
1               5                   10                  15

Gln Ala Ala Lys Glu Phe Ile Ala Trp Leu Val Arg Gly Arg Gly
            20                  25                  30

<210> SEQ ID NO 8
<211> LENGTH: 29
<212> TYPE: PRT
<213> ORGANISM: Artificial Sequence
<220> FEATURE:
<223> OTHER INFORMATION: dasiglucagon
<220> FEATURE:
<221> NAME/KEY: MOD_RES
<222> LOCATION: (16)..(16)
<223> OTHER INFORMATION: Aib

<400> SEQUENCE: 8

His Ser Gln Gly Thr Phe Thr Ser Asp Tyr Ser Lys Tyr Leu Asp Xaa
1               5                   10                  15

Ala Arg Ala Glu Glu Phe Val Lys Trp Leu Glu Ser Thr
            20                  25

<210> SEQ ID NO 9
<211> LENGTH: 39
<212> TYPE: PRT
<213> ORGANISM: Artificial Sequence
<220> FEATURE:
<223> OTHER INFORMATION: glepaglutide
<220> FEATURE:
<221> NAME/KEY: MOD_RES
<222> LOCATION: (39)..(39)
<223> OTHER INFORMATION: AMIDATION C-terminal

<400> SEQUENCE: 9

His Gly Glu Gly Thr Phe Ser Ser Glu Leu Ala Thr Ile Leu Asp Ala
1               5                   10                  15

Leu Ala Ala Arg Asp Phe Ile Ala Trp Leu Ile Ala Thr Lys Ile Thr
            20                  25                  30

Asp Lys Lys Lys Lys Lys Lys
        35

<210> SEQ ID NO 10
<211> LENGTH: 39
<212> TYPE: PRT
<213> ORGANISM: Artificial Sequence
<220> FEATURE:
<223> OTHER INFORMATION: elsiglutide
<220> FEATURE:
<221> NAME/KEY: MOD_RES
<222> LOCATION: (39)..(39)
<223> OTHER INFORMATION: AMIDATION C-terminal

<400> SEQUENCE: 10

His Gly Glu Gly Ser Phe Ser Ser Glu Leu Ser Thr Ile Leu Asp Ala
1               5                   10                  15
```

```
Leu Ala Ala Arg Asp Phe Ile Ala Trp Leu Ile Ala Thr Lys Ile Thr
            20                  25                  30

Asp Lys Lys Lys Lys Lys Lys
        35

<210> SEQ ID NO 11
<211> LENGTH: 34
<212> TYPE: PRT
<213> ORGANISM: Artificial Sequence
<220> FEATURE:
<223> OTHER INFORMATION: teriparatide
<220> FEATURE:
<221> NAME/KEY: MOD_RES
<222> LOCATION: (1)..(1)
<223> OTHER INFORMATION: N-terminal phenylacetylation might be present
      in the teriparatide precursor

<400> SEQUENCE: 11

Ser Val Ser Glu Ile Gln Leu Met His Asn Leu Gly Lys His Leu Asn
1               5                   10                  15

Ser Met Glu Arg Val Glu Trp Leu Arg Lys Lys Leu Gln Asp Val His
            20                  25                  30

Asn Phe

<210> SEQ ID NO 12
<211> LENGTH: 32
<212> TYPE: PRT
<213> ORGANISM: Salmo salar
<220> FEATURE:
<221> NAME/KEY: DISULFID
<222> LOCATION: (1)..(7)
<220> FEATURE:
<221> NAME/KEY: MOD_RES
<222> LOCATION: (32)..(32)
<223> OTHER INFORMATION: AMIDATION C-terminal

<400> SEQUENCE: 12

Cys Ser Asn Leu Ser Thr Cys Val Leu Gly Lys Leu Ser Gln Glu Leu
1               5                   10                  15

His Lys Leu Gln Thr Tyr Pro Arg Thr Asn Thr Gly Ser Gly Thr Pro
            20                  25                  30

<210> SEQ ID NO 13
<211> LENGTH: 20
<212> TYPE: PRT
<213> ORGANISM: artificial sequence
<220> FEATURE:
<223> OTHER INFORMATION: bivalirudin
<220> FEATURE:
<221> NAME/KEY: MOD_RES
<222> LOCATION: (1)..(1)
<223> OTHER INFORMATION: D-Phe

<400> SEQUENCE: 13

Xaa Pro Arg Pro Gly Gly Gly Gly Asn Gly Asp Phe Glu Glu Ile Pro
1               5                   10                  15

Glu Glu Tyr Leu
        20

<210> SEQ ID NO 14
<211> LENGTH: 8
<212> TYPE: PRT
<213> ORGANISM: Artificial sequence
<220> FEATURE:
<223> OTHER INFORMATION: 8-mer model peptide
<220> FEATURE:
<221> NAME/KEY: MOD_RES
```

```
<222> LOCATION: (1)..(1)
<223> OTHER INFORMATION: ACETYLATION N-terminal
<220> FEATURE:
<221> NAME/KEY: MOD_RES
<222> LOCATION: (8)..(8)
<223> OTHER INFORMATION: AMIDATION C-terminal

<400> SEQUENCE: 14

Asp Phe Ser Lys Leu Ala Leu Arg
1               5

<210> SEQ ID NO 15
<211> LENGTH: 8
<212> TYPE: PRT
<213> ORGANISM: Artificial Sequence
<220> FEATURE:
<223> OTHER INFORMATION: Dasi 1-8
<220> FEATURE:
<221> NAME/KEY: MOD_RES
<222> LOCATION: (8)..(8)
<223> OTHER INFORMATION: C-terminal (thio)ester

<400> SEQUENCE: 15

His Ser Gln Gly Thr Phe Thr Ser
1               5

<210> SEQ ID NO 16
<211> LENGTH: 21
<212> TYPE: PRT
<213> ORGANISM: Artificial Sequence
<220> FEATURE:
<223> OTHER INFORMATION: Dasi 9-29
<220> FEATURE:
<221> NAME/KEY: MOD_RES
<222> LOCATION: (8)..(8)
<223> OTHER INFORMATION: Aib

<400> SEQUENCE: 16

Asp Tyr Ser Lys Tyr Leu Asp Xaa Ala Arg Ala Glu Glu Phe Val Lys
1               5                   10                  15

Trp Leu Glu Ser Thr
            20

<210> SEQ ID NO 17
<211> LENGTH: 9
<212> TYPE: PRT
<213> ORGANISM: Artificial Sequence
<220> FEATURE:
<223> OTHER INFORMATION: Dasi 1-9
<220> FEATURE:
<221> NAME/KEY: MOD_RES
<222> LOCATION: (9)..(9)
<223> OTHER INFORMATION: C-terminal (thio)ester

<400> SEQUENCE: 17

His Ser Gln Gly Thr Phe Thr Ser Asp
1               5

<210> SEQ ID NO 18
<211> LENGTH: 20
<212> TYPE: PRT
<213> ORGANISM: Artificial Sequence
<220> FEATURE:
<223> OTHER INFORMATION: Dasi 10-29
<220> FEATURE:
<221> NAME/KEY: MOD_RES
<222> LOCATION: (7)..(7)
<223> OTHER INFORMATION: Aib

<400> SEQUENCE: 18
```

-continued

```
Tyr Ser Lys Tyr Leu Asp Xaa Ala Arg Ala Glu Glu Phe Val Lys Trp
1               5                   10                  15

Leu Glu Ser Thr
            20

<210> SEQ ID NO 19
<211> LENGTH: 10
<212> TYPE: PRT
<213> ORGANISM: Artificial Sequence
<220> FEATURE:
<223> OTHER INFORMATION: Dasi 1-10
<220> FEATURE:
<221> NAME/KEY: MOD_RES
<222> LOCATION: (10)..(10)
<223> OTHER INFORMATION: C-terminal (thio)ester

<400> SEQUENCE: 19

His Ser Gln Gly Thr Phe Thr Ser Asp Tyr
1               5                   10

<210> SEQ ID NO 20
<211> LENGTH: 19
<212> TYPE: PRT
<213> ORGANISM: Artificial Sequence
<220> FEATURE:
<223> OTHER INFORMATION: Dasi 11-29
<220> FEATURE:
<221> NAME/KEY: MOD_RES
<222> LOCATION: (6)..(6)
<223> OTHER INFORMATION: Aib

<400> SEQUENCE: 20

Ser Lys Tyr Leu Asp Xaa Ala Arg Ala Glu Glu Phe Val Lys Trp Leu
1               5                   10                  15

Glu Ser Thr

<210> SEQ ID NO 21
<211> LENGTH: 11
<212> TYPE: PRT
<213> ORGANISM: Artificial Sequence
<220> FEATURE:
<223> OTHER INFORMATION: Glepa 1-11
<220> FEATURE:
<221> NAME/KEY: MOD_RES
<222> LOCATION: (11)..(11)
<223> OTHER INFORMATION: C-terminal (thio)ester

<400> SEQUENCE: 21

His Gly Glu Gly Thr Phe Ser Ser Glu Leu Ala
1               5                   10

<210> SEQ ID NO 22
<211> LENGTH: 28
<212> TYPE: PRT
<213> ORGANISM: Artificial Sequence
<220> FEATURE:
<223> OTHER INFORMATION: Glepa 12-39

<400> SEQUENCE: 22

Thr Ile Leu Asp Ala Leu Ala Ala Arg Asp Phe Ile Ala Trp Leu Ile
1               5                   10                  15

Ala Thr Lys Ile Thr Asp Lys Lys Lys Lys Lys Lys
            20                  25

<210> SEQ ID NO 23
<211> LENGTH: 16
```

```
<212> TYPE: PRT
<213> ORGANISM: Artificial Sequence
<220> FEATURE:
<223> OTHER INFORMATION: Glepa 1-16
<220> FEATURE:
<221> NAME/KEY: MOD_RES
<222> LOCATION: (16)..(16)
<223> OTHER INFORMATION: C-terminal (thio)ester

<400> SEQUENCE: 23

His Gly Glu Gly Thr Phe Ser Ser Glu Leu Ala Thr Ile Leu Asp Ala
1               5                   10                  15

<210> SEQ ID NO 24
<211> LENGTH: 23
<212> TYPE: PRT
<213> ORGANISM: Artificial Sequence
<220> FEATURE:
<223> OTHER INFORMATION: Glepa 17-39

<400> SEQUENCE: 24

Leu Ala Ala Arg Asp Phe Ile Ala Trp Leu Ile Ala Thr Lys Ile Thr
1               5                   10                  15

Asp Lys Lys Lys Lys Lys Lys
            20

<210> SEQ ID NO 25
<211> LENGTH: 11
<212> TYPE: PRT
<213> ORGANISM: Artificial Sequence
<220> FEATURE:
<223> OTHER INFORMATION: Elsi 1-11
<220> FEATURE:
<221> NAME/KEY: MOD_RES
<222> LOCATION: (11)..(11)
<223> OTHER INFORMATION: C-terminal (thio)ester

<400> SEQUENCE: 25

His Gly Glu Gly Ser Phe Ser Ser Glu Leu Ser
1               5                   10

<210> SEQ ID NO 26
<211> LENGTH: 28
<212> TYPE: PRT
<213> ORGANISM: Artificial Sequence
<220> FEATURE:
<223> OTHER INFORMATION: Elsi 12-39

<400> SEQUENCE: 26

Thr Ile Leu Asp Ala Leu Ala Ala Arg Asp Phe Ile Ala Trp Leu Ile
1               5                   10                  15

Ala Thr Lys Ile Thr Asp Lys Lys Lys Lys Lys Lys
            20                  25

<210> SEQ ID NO 27
<211> LENGTH: 16
<212> TYPE: PRT
<213> ORGANISM: Artificial Sequence
<220> FEATURE:
<223> OTHER INFORMATION: Elsi 1-16
<220> FEATURE:
<221> NAME/KEY: MOD_RES
<222> LOCATION: (16)..(16)
<223> OTHER INFORMATION: C-terminal (thio)ester

<400> SEQUENCE: 27

His Gly Glu Gly Ser Phe Ser Ser Glu Leu Ser Thr Ile Leu Asp Ala
1               5                   10                  15
```

```
<210> SEQ ID NO 28
<211> LENGTH: 23
<212> TYPE: PRT
<213> ORGANISM: Artificial Sequence
<220> FEATURE:
<223> OTHER INFORMATION: Elsi 17-39

<400> SEQUENCE: 28

Leu Ala Ala Arg Asp Phe Ile Ala Trp Leu Ile Ala Thr Lys Ile Thr
1               5                   10                  15

Asp Lys Lys Lys Lys Lys Lys
            20

<210> SEQ ID NO 29
<211> LENGTH: 11
<212> TYPE: PRT
<213> ORGANISM: Artificial Sequence
<220> FEATURE:
<223> OTHER INFORMATION: Teri 1-11
<220> FEATURE:
<221> NAME/KEY: MOD_RES
<222> LOCATION: (11)..(11)
<223> OTHER INFORMATION: C-terminal (thio)ester

<400> SEQUENCE: 29

Ser Val Ser Glu Ile Gln Leu Met His Asn Leu
1               5                   10

<210> SEQ ID NO 30
<211> LENGTH: 23
<212> TYPE: PRT
<213> ORGANISM: Artificial Sequence
<220> FEATURE:
<223> OTHER INFORMATION: Teri 12-34

<400> SEQUENCE: 30

Gly Lys His Leu Asn Ser Met Glu Arg Val Glu Trp Leu Arg Lys Lys
1               5                   10                  15

Leu Gln Asp Val His Asn Phe
            20

<210> SEQ ID NO 31
<211> LENGTH: 12
<212> TYPE: PRT
<213> ORGANISM: Artificial Sequence
<220> FEATURE:
<223> OTHER INFORMATION: Calci 1-12
<220> FEATURE:
<221> NAME/KEY: MOD_RES
<222> LOCATION: (12)..(12)
<223> OTHER INFORMATION: C-terminal (thio)ester

<400> SEQUENCE: 31

Cys Ser Asn Leu Ser Thr Cys Val Leu Gly Lys Leu
1               5                   10

<210> SEQ ID NO 32
<211> LENGTH: 20
<212> TYPE: PRT
<213> ORGANISM: Artificial Sequence
<220> FEATURE:
<223> OTHER INFORMATION: Calci 13-32
<220> FEATURE:
<221> NAME/KEY: MOD_RES
<222> LOCATION: (20)..(20)
<223> OTHER INFORMATION: AMIDATION C-terminal might be present
```

```
<400> SEQUENCE: 32

Ser Gln Glu Leu His Lys Leu Gln Thr Tyr Pro Arg Thr Asn Thr Gly
1               5                   10                  15

Ser Gly Thr Pro
            20

<210> SEQ ID NO 33
<211> LENGTH: 20
<212> TYPE: PRT
<213> ORGANISM: Artificial Sequence
<220> FEATURE:
<223> OTHER INFORMATION: Calci 1-20
<220> FEATURE:
<221> NAME/KEY: MOD_RES
<222> LOCATION: (20)..(20)
<223> OTHER INFORMATION: C-terminal (thio)ester

<400> SEQUENCE: 33

Cys Ser Asn Leu Ser Thr Cys Val Leu Gly Lys Leu Ser Gln Glu Leu
1               5                   10                  15

His Lys Leu Gln
            20

<210> SEQ ID NO 34
<211> LENGTH: 12
<212> TYPE: PRT
<213> ORGANISM: Artificial Sequence
<220> FEATURE:
<223> OTHER INFORMATION: Calci 21-32

<400> SEQUENCE: 34

Thr Tyr Pro Arg Thr Asn Thr Gly Ser Gly Thr Pro
1               5                   10

<210> SEQ ID NO 35
<211> LENGTH: 10
<212> TYPE: PRT
<213> ORGANISM: Artificial Sequence
<220> FEATURE:
<223> OTHER INFORMATION: Biva 1-10
<220> FEATURE:
<221> NAME/KEY: MOD_RES
<222> LOCATION: (1)..(1)
<223> OTHER INFORMATION: D-Phe
<220> FEATURE:
<221> NAME/KEY: MOD_RES
<222> LOCATION: (10)..(10)
<223> OTHER INFORMATION: C-terminal (thio)ester

<400> SEQUENCE: 35

Xaa Pro Arg Pro Gly Gly Gly Gly Asn Gly
1               5                   10

<210> SEQ ID NO 36
<211> LENGTH: 10
<212> TYPE: PRT
<213> ORGANISM: Artificial Sequence
<220> FEATURE:
<223> OTHER INFORMATION: Biva 11-20

<400> SEQUENCE: 36

Asp Phe Glu Glu Ile Pro Glu Glu Tyr Leu
1               5                   10

<210> SEQ ID NO 37
<211> LENGTH: 11
<212> TYPE: PRT
```

```
<213> ORGANISM: Artificial Sequence
<220> FEATURE:
<223> OTHER INFORMATION: Lira-Sema 1-11
<220> FEATURE:
<221> NAME/KEY: VARIANT
<222> LOCATION: (2)..(2)
<223> OTHER INFORMATION: Ala or Aib
<220> FEATURE:
<221> NAME/KEY: MOD_RES
<222> LOCATION: (11)..(11)
<223> OTHER INFORMATION: C-terminal (thio)ester

<400> SEQUENCE: 37

His Xaa Glu Gly Thr Phe Thr Ser Asp Val Ser
1               5                   10

<210> SEQ ID NO 38
<211> LENGTH: 20
<212> TYPE: PRT
<213> ORGANISM: Artificial Sequence
<220> FEATURE:
<223> OTHER INFORMATION: Lira-Sema 12-31
<220> FEATURE:
<221> NAME/KEY: MOD_RES
<222> LOCATION: (9)..(9)
<223> OTHER INFORMATION: Lys is selected from Lys, Lys(PG),
      Lys(gamma-Glu), Lys(Pal-gamma-Glu) and
      Lys(AEEA-AEEA-gamma-Glu-17-carboxyheptadecanoyl)

<400> SEQUENCE: 38

Ser Tyr Leu Glu Gly Gln Ala Ala Lys Glu Phe Ile Ala Trp Leu Val
1               5                   10                  15

Arg Gly Arg Gly
            20

<210> SEQ ID NO 39
<211> LENGTH: 11
<212> TYPE: PRT
<213> ORGANISM: Artificial Sequence
<220> FEATURE:
<223> OTHER INFORMATION: Lira 1-11
<220> FEATURE:
<221> NAME/KEY: MOD_RES
<222> LOCATION: (11)..(11)
<223> OTHER INFORMATION: C-terminal  -OCam-Phe-Lys-NH2 ester

<400> SEQUENCE: 39

His Ala Glu Gly Thr Phe Thr Ser Asp Val Ser
1               5                   10

<210> SEQ ID NO 40
<211> LENGTH: 20
<212> TYPE: PRT
<213> ORGANISM: Artificial Sequence
<220> FEATURE:
<223> OTHER INFORMATION: Lira 12-31
<220> FEATURE:
<221> NAME/KEY: MOD_RES
<222> LOCATION: (9)..(9)
<223> OTHER INFORMATION: Lys is Lys(Pal-gamma-Glu)

<400> SEQUENCE: 40

Ser Tyr Leu Glu Gly Gln Ala Ala Lys Glu Phe Ile Ala Trp Leu Val
1               5                   10                  15

Arg Gly Arg Gly
            20

<210> SEQ ID NO 41
<211> LENGTH: 5
```

```
<212> TYPE: PRT
<213> ORGANISM: Artificial Sequence
<220> FEATURE:
<223> OTHER INFORMATION: model peptide fragment
<220> FEATURE:
<221> NAME/KEY: MOD_RES
<222> LOCATION: (1)..(1)
<223> OTHER INFORMATION: ACETYLATION N-terminal
<220> FEATURE:
<221> NAME/KEY: MOD_RES
<222> LOCATION: (5)..(5)
<223> OTHER INFORMATION: C-terminal  -OCam-Leu-OH ester or OH

<400> SEQUENCE: 41

Asp Phe Ser Lys Leu
1               5

<210> SEQ ID NO 42
<211> LENGTH: 42
<212> TYPE: PRT
<213> ORGANISM: Artificial Sequence
<220> FEATURE:
<223> OTHER INFORMATION: lira 1-11-1-31
<220> FEATURE:
<221> NAME/KEY: MOD_RES
<222> LOCATION: (31)..(31)
<223> OTHER INFORMATION: Lys is Lys(Pal-gamma-Glu)

<400> SEQUENCE: 42

His Ala Glu Gly Thr Phe Thr Ser Asp Val Ser His Ala Glu Gly Thr
1               5                  10                  15

Phe Thr Ser Asp Val Ser Ser Tyr Leu Glu Gly Gln Ala Ala Lys Glu
            20                  25                  30

Phe Ile Ala Trp Leu Val Arg Gly Arg Gly
        35                  40

<210> SEQ ID NO 43
<211> LENGTH: 11
<212> TYPE: PRT
<213> ORGANISM: Artificial Sequence
<220> FEATURE:
<223> OTHER INFORMATION: Teri 1-11 ester
<220> FEATURE:
<221> NAME/KEY: MOD_RES
<222> LOCATION: (1)..(1)
<223> OTHER INFORMATION: N-terminal phenylacetilation
<220> FEATURE:
<221> NAME/KEY: MOD_RES
<222> LOCATION: (11)..(11)
<223> OTHER INFORMATION: C-terminal -OCam-Leu-OH ester

<400> SEQUENCE: 43

Ser Val Ser Glu Ile Gln Leu Met His Asn Leu
1               5                  10

<210> SEQ ID NO 44
<211> LENGTH: 11
<212> TYPE: PRT
<213> ORGANISM: Artificial Sequence
<220> FEATURE:
<223> OTHER INFORMATION: Sema 1-11
<220> FEATURE:
<221> NAME/KEY: MOD_RES
<222> LOCATION: (2)..(2)
<223> OTHER INFORMATION: Aib
<220> FEATURE:
<221> NAME/KEY: MOD_RES
<222> LOCATION: (11)..(11)
<223> OTHER INFORMATION: C-terminal -OCam-Phe-Lys-NH2 ester

<400> SEQUENCE: 44
```

```
His Xaa Glu Gly Thr Phe Thr Ser Asp Val Ser
1               5                   10

<210> SEQ ID NO 45
<211> LENGTH: 20
<212> TYPE: PRT
<213> ORGANISM: Artificial Sequence
<220> FEATURE:
<223> OTHER INFORMATION: Sema 12-31
<220> FEATURE:
<221> NAME/KEY: MOD_RES
<222> LOCATION: (9)..(9)
<223> OTHER INFORMATION: Lys is Lys(AEEA-AEEA-gamma-Glu-17-
      carboxyheptadecanoyl)

<400> SEQUENCE: 45

Ser Tyr Leu Glu Gly Gln Ala Ala Lys Glu Phe Ile Ala Trp Leu Val
1               5                   10                  15

Arg Gly Arg Gly
            20
```

SUBTILISIN VARIANTS AND THEIR USE

CROSS-REFERENCE TO RELATED APPLICATIONS

This application is a 371 of PCT/EP2022/053121, filed Feb. 9, 2022, which claims the benefit of European Patent Application Nos. 21156989.2, filed Feb. 12, 2021 and 21176039.2, filed May 26, 2021.

CROSS-REFERENCE TO A SEQUENCE LISTING SUBMITTED ELECTRONICALLY VIA PATENTCENTER

The contents of the electronically submitted sequence listing, file name: 2310-05_SequenceListing.txt; size: 25500 bytes; and date of creation: Aug. 3, 2023, filed herewith, are incorporated herein by reference in its entirety.

FIELD OF THE INVENTION

The invention relates to an enzyme, which is a subtilisin BPN' variant or homologue thereof. The invention further relates to a method wherein such enzyme catalyses the coupling of peptide fragments, and to a method for peptide synthesis employing such an enzyme.

BACKGROUND ART

Processes for synthesizing peptides are generally known in the art. Relatively short peptides can be chemically synthesized in a stepwise process in solution or by a process known as solid phase peptide synthesis referring to a synthesis wherein the peptide is built while one end is fixed to a solid phase, via highly optimized processes. However, peptides longer than 10-15 amino acids are often difficult to synthesize due to potential side reactions. Consequently, purification thereof is troublesome. Therefore, such peptides are often synthesized by a combination of solid phase synthesis of side-chain protected peptide fragments and their subsequent chemical condensation in solution. The major drawback of chemical coupling of side-chain protected peptide fragments is the racemisation that occurs upon activation of the acyl donor C-terminal amino acid residue. In contrast, in enzyme-catalysed coupling of peptide fragments racemisation is not observed. Another advantage over chemical peptide synthesis is the absence of side reactions on the side-chain functionalities. When chemically synthesized peptides are enzymatically coupled this is referred to as chemo-enzymatic peptide synthesis (CEPS®).

The term chemo-enzymatic peptide synthesis refers to the enzymatic coupling of peptide fragments which have individually been synthesized using chemical synthesis (either in solution and/or solid phase), fermentation, or by a combination of chemical and enzymatic coupling steps.

It was found by Wells et al. (U.S. Pat. No. 5,403,737) that the coupling of peptides in aqueous solution could be significantly improved by altering the active site of subtilisin BPN', a subtilisin from *B. amyloliquefaciens* (SEQ ID NO: 2). When two mutations were introduced, i.e. S221C and P225A, a subtilisin BPN' variant called subtiligase was obtained having a 500-fold increased synthesis over hydrolysis ratio (S/H ratio) as compared to wild-type subtilisin BPN'. In further experiments Wells et al. introduced five additional mutations to subtiligase, i.e. M50F, N76D, N109S, K213R and N218S, to increase the enzyme's stability (Proc. Natl. Acad. Sci. USA, 1994, 91, 12544). The new mutant called stabiligase appeared moderately more resistant to a treatment with sodium dodecasulphate and guanidinium hydrochloride, but hydrolysis was still a major side reaction.

The problem of undesirably high hydrolytic activity of enzymes like subtiligase or stabiligase when used for peptide synthesis in an aqueous environment was addressed in WO 2016/056913 wherein subtilisin BPN' variants characterized by a deletion of the amino acids at positions 75-83, and by a mutation at the amino acid position S221 were provided, showing an improved S/H ratio.

In WO 2018/212658 further subtilisin BPN' mutants were provided with one or more specific mutations in the penultimate pockets to the coupling site, i.e., in the S2' pocket and/or in the S2 pocket, thereby broadening the peptide substrate scope and improving coupling efficiency.

WO2019170895 and WO2019170918 disclosed methods for enzymatically synthesizing liraglutide and semaglutide by a specific peptide fragment coupling strategy, catalyzed by subtilisin BPN' mutants.

Nevertheless, there remains a need to provide further subtilisin BPN' variants or homologues thereof that can be used in the enzymatic synthesis of peptides by fragment coupling or cyclization, which improve the reaction rate and the coupling reaction efficiency, while maintaining or improving the BPN' variant stability.

There also remains a need to find efficient methods for enzymatically synthesizing new peptides of pharmacological interest, especially methods which are suitable for industrial application.

The enzymes and methods according to the invention solve or at least lessen some or all of the above-mentioned problems.

SUMMARY OF THE INVENTION

It has now been found that all or at least some of the above discussed problems can be overcome by providing new enzymes with one or more specific mutations in the acyl donor binding pockets of the subtilisin BPN' variants or homologue thereof.

Accordingly, in a first embodiment the present invention provides a subtilisin BPN' variant or homologue thereof, having at least 80% sequence identity to subtilisin BPN' SEQ ID NO: 2, comprising a deletion of the amino acids at positions 75-83, and a mutation at the amino acid position S221, the mutation being S221C or S221 selenocysteine, preferably S221C; and characterized by having at least one mutation at an amino acid position selected from the group consisting of L96, D99, A223 and S224, wherein the amino acid positions are defined according to SEQ ID NO: 2 or a homologue sequence thereof, and wherein such variant or homologue thereof has ligase and/or cyclase activity with an increased reaction rate and coupling efficiency.

The enzymes according to the invention have catalytic activity with respect to the formation of a peptide bond (coupling activity). Such activity is also referred to as "ligase activity".

The invention provides enzymes which show an increased reaction rate and increased coupling efficiency, preferably in an aqueous reaction medium. The invention also provides enzymes with an increased selectivity towards the coupling reaction of (a) a peptide C-terminal (thio)ester with (b) a peptide nucleophile having an N-terminal unprotected amine thereby resulting in the target peptide.

Thus, in a second embodiment, the present invention provides a method for enzymatically synthesizing a peptide, comprising a step of coupling (a) a peptide C-terminal (thio)ester with (b) a peptide nucleophile having an N-terminal unprotected amine, wherein the coupling is preferably performed in an aqueous solution, and wherein the coupling is catalyzed by a subtilisin BPN' variant or homologue thereof, having at least 80% sequence identity to subtilisin BPN' SEQ ID NO: 2, comprising a deletion of the amino acids at positions 75-83, and a mutation at the amino acid position S221, the mutation being S221C or S221 selenocysteine, preferably S221C; and characterized by having at least one mutation at an amino acid position selected from the group consisting of L96, D99, A223 and S224, wherein the amino acid positions are defined according to SEQ ID NO: 2 or a homologue sequence thereof.

DETAILED DESCRIPTION OF THE INVENTION

As used herein, the term "reaction" refers to reactions taking place under catalysis by subtilisin BPN' variants or homologues thereof. Specifically, the terms "coupling reaction" or "coupling" or refer to the formation of an amide bond (or peptide bond) between an amino group and a carboxylic group. This may involve two molecules (intermolecular coupling reaction) or one molecule (intramolecular coupling reaction).

As used herein, the term "reaction rate" refers to the speed at which the peptide acyl donor (thio)ester starting material is consumed by the subtilisin BPN' variant or homologue thereof. When the acyl enzyme complex is formed, the acyl donor can be coupled to the acyl acceptor (i.e. the peptide nucleophile) (preferred coupling reaction) or can be hydrolysed by water (undesired side-reaction). The acyl donor reaction rate, or conversion rate, is the sum of the product formation rate and the hydrolysis rate. Enzymes with an improved reaction rate possess a higher catalytic efficiency compared to the wild-type enzyme. Using the same amount of enzyme, the reaction is completed in a shorter amount of time.

As used herein, the term "(thio)ester" is a shortened form for the phrase "ester or thioester".

As used herein, the term "coupling efficiency" or "coupling reaction efficiency" refers to the amount of the peptide ligation product (i.e. the target peptide) formed within a certain amount of time by the catalytic action of the subtilisin BPN' variant or homologue thereof. Enzymes with an improved coupling efficiency synthesize more product within a certain amount of time compared to the wild-type enzyme. For coupling efficiency evaluation, the acyl donor (thio)ester hydrolysis is not taken into account.

As used herein, the term "synthesis over hydrolysis ratio" (S/H ratio) refers to the amount of the peptide ligation product divided by the amount of the acyl donor (thio)ester, which has been hydrolyzed (i.e. the acyl donor (thio)acid). When the acyl donor (thio)ester is used in excess in the reaction, an estimation of S/H ratio can be given by the amount of the peptide ligation product divided by the amount of the peptide nucleophile.

As used herein, the term "selectivity" refers to the amount of the peptide ligation product divided by the amount of the by-product formed when the acyl donor (thio)ester reacts with the N-terminally unprotected amine of the peptide ligation product. Such by-product formation is highly undesirable, consuming one of the reactants and the target peptide for each molecule of by-product. A highly selective enzyme is therefore mostly preferred.

As used herein, the term "peptide" refers to any sequence composed of two or more amino acids linked one to the other linearly by amide bonds. A peptide is usually formed by alpha-amino acids, although a peptide may comprise other amino acids, such as one or more beta-amino acids and/or one or more gamma-amino acids. Any peptide is defined by its specific sequence of amino acids.

Peptides are distinguished from proteins by their shorter length, although the cut-off number of amino acids for differentiating a peptide from a protein varies in the art. Typically, a peptide comprises from 2 to 500, more typically from 2 to 200 or from 2 to 100 amino acids. Preferably, the peptide comprises at least 10 amino acids, more preferably at least 15 amino acids. Furthermore, the peptide is not more than 200, preferably not more than 100, most preferably not more than 50 amino acids long. Accordingly, most preferably the length of a peptide is between 10 and 50 amino acids.

A peptide may contain proteinogenic amino acids and/or non-proteinogenic amino acids. The proteinogenic amino acids are the alpha-amino acids with L-configuration that are encoded by the genetic code. Non-proteinogenic amino acids are non-natural amino acids, such as D-amino acids, L- or D-phenylglycine, DOPA (3,4-dihydroxy-L-phenylalanine), beta-amino acids, 4-fluoro-phenylalanine, alpha-aminoisobutyric acid (Aib), other C-alpha-alkylated amino acids and selenocysteine (Sec, U), which is an amino acid whose structure corresponds to cysteine but with a selenium replacing the sulphur atom. A peptide may be linear, branched or cyclic, wherein a branched peptide has at least two interconnected amino acid sequences.

A peptide may consist of amino acids or of amino acids and protective groups, wherein protective groups may be present at terminal amino and carboxylic groups or at amino acids side-chains. As used herein, the expression "amino acid side-chain" refers to any proteinogenic or non-proteinogenic amino acid side-chain.

A peptide may be a "conjugate peptide", i.e. a peptide sequence of two or more amino acids attached to another residue, such as a synthetic hydrophilic polymer, for example a polyalkylene glycol, preferably a polyethylene glycol (PEG); a lipophilic moiety or an amino acid or a combination thereof; an imaging agent; a radio-therapeutic agent; a toxin; another non-peptidic agent, such as a chelating agent, or a non-peptidic biologically active moiety.

A peptide may be a biologically active peptide. Preferred examples of biologically active peptides include glucagon, glp-1, glp-2 and their analogues, such as dasiglucagon, exenatide, liraglutide, semaglutide, lixisenatide, teduglutide, glepaglutide, dulaglutide, elsiglutide; thymosin-alpha-1, thymosin-alpha-1 analogues, teriparatide, salmon calcitonin, bivalirudin, and peptides comprising the sequence of any of these and at least one further amino acid.

As used herein, the term "cyclic peptide" refers to a peptide with a ring structure, wherein such peptide results from the formation of an amide bond between the terminal alpha-amino group and the terminal alpha-carboxylic group of an amino acid sequence, also referred to as "cyclization reaction". In particular, such amino acid sequence has at least 12 amino acids.

As used herein, the term "peptide bond" refers to the amide bond between (i) the amino group of one amino acid and (ii) the carboxyl group of another amino acid. In particular, a peptide bond may be between the alpha-amino group of one alpha-amino acid and the alpha-carboxyl group of another alpha-amino acid.

As used herein when referring to proteins or enzymes, the term "mutated" or "mutation" means that at least one amino acid in the wild-type or naturally occurring protein or enzyme sequence has been replaced with a different amino acid, inserted into, appended to, or deleted from the sequence via mutagenesis of nucleic acids encoding these amino acids. Mutagenesis includes, for example, site-directed mutagenesis by means of PCR or via oligonucleotide-mediated mutagenesis as described, for instance, in Siloto et al. Site saturation mutagenesis: Methods and applications in protein engineering, Biocatalysis and Agricultural Biotechnology 1 (2012) 181-189. The term "mutated" or "mutation" as used herein when referring to nucleic acids or genes means that at least one nucleotide in the nucleic acid sequence, has been replaced with a different nucleotide, has been inserted into, has been appended to, or has been deleted from the sequence via mutagenesis, resulting in the transcription of a protein sequence with a qualitatively or quantitatively altered function or resulting in a "knock-out" of that nucleic acid, which refers to a nucleic acid that no longer encodes a protein with the functionality it used to encode before it was mutated.

In the present disclosure, a mutation is described by using the single letter amino acid code of the amino acid that is substituted, followed by the number designating where in the protein amino acid sequence the substitution is made. This number is the amino acid position of the wild-type amino acid sequence. Thus, for the mutated amino acid sequence it is the amino acid position corresponding to the position with that number in the wild-type enzyme. Due to one or more other mutations at a lower position (additions, insertions, deletions, etc.) the actual position in the mutant is not necessarily the same. The skilled person will be able to determine the corresponding positions using a generally known alignment technique, such as NEEDLE. The number is then followed by the single letter code of the amino acid that replaces the wild-type amino acid therein. For example, F189W denotes the substitution of phenylalanine (F) at the position 189 with tryptophan (W). X is used to indicate that any proteinogenic amino acid other than the amino acid which is to be substituted may be present at this position. For example, F189X denotes the substitution of phenylalanine at the position 189 with any other proteinogenic amino acid.

As used herein, the term "ligase" refers to an enzyme having catalytic activity in the coupling of two peptides by catalysing the formation of a peptide bond between the C-terminus of a first peptide and the N-terminus of another peptide. Such activity is also referred to as "ligase activity". This activity may also be referred to as "cyclase activity" in case that such enzyme has catalytic activity in the formation of an intramolecular peptide bond between the C-terminus and the N-terminus of the same peptidic molecule. Therefore, the same enzyme can have ligase and/or cyclase activity. An enzyme may be characterised as having ligase activity when its S/H ratio is above 1. This S/H ratio can be determined by HPLC analysis of the respective amounts.

A ligase typically has an S/H ratio larger than 1, preferably 2 or more, in particular 5 or more in the used reaction medium, in particular in a reaction medium comprising water, more in particular an aqueous medium, also referred to as aqueous solution. The upper value of this quotient is not critical; it may be, for instance, 100 or less.

An enzyme "homologue", as referred to herein, is an enzyme having an intended function in common with the enzyme it is a homologue of, such as being capable of catalyzing the same reaction. In the present disclosure, such reaction is a coupling reaction, i.e. the formation of a peptide bond. In particular, as used herein, a homologue of an enzyme has ligase and/or cyclase activity.

The term homologue is further defined by a certain level of similarity of its sequence compared to the enzyme it is a homologue of. Throughout the application such level of similarity is referred to as "percent identity" or "sequence identity". The terms "percent identity" and "sequence identity" are used interchangeably herein.

According to the invention, a "subtilisin BPN' homologue" is an enzyme, having ligase and/or cyclase activity and having a sequence identity to subtilisin BPN' of at least 80%, preferably at least 85%, more preferably at least 90%; more preferably at least 95%, or at least 96%, or at least 97%, or at least 98% or at least 99% with the enzyme, which the homologue peptide or enzyme is compared with. The percent identity is determined according to the NEEDLE EMBOSS method as outlined below. Evidently, the percent identity will be less than 100%. The percent identity will depend on the number of mutations and the length of the peptide (enzyme) with which the homologue is compared.

For the purpose of this invention, it is defined herein that in order to determine the percent identity of two amino acid sequences, the complete mature sequences are aligned for optimal comparison purposes such that similar regions are aligned. Any sequence elongations (either at N or C-terminus), such as the commonly used His tags or other tags used, for instance, for purification, signaling, solubilization and localization purposes, are not be considered in the determination of the percent identity. In order to optimize the alignment between the two sequences, gaps may be introduced in any of the two sequences that are compared. The alignment used to determine a sequence identity % value is carried out over a length of at least 200 amino acids of the sequences being compared.

A comparison of sequences and determination of percent identity between two sequences can be accomplished using a mathematical algorithm, for instance the Needleman-Wunsch algorithm (Needleman, S. B. and Wunsch, C. D. (1970) J. Mol. Biol. 48(3), pp 443-453), which has been implemented in the computer program NEEDLE.

The NEEDLE program from the EMBOSS package is used (version 2.8.0 or higher, EMBOSS: The European Molecular Biology Open Software Suite (2000) Rice, P. Longden, I. and Bleasby, A., Trends in Genetics 16, (6) pp 276-277) for the calculation of percent identity. For protein sequences, EBLOSUM62 should be used for the substitution matrix. The parameters used for alignment of amino acid sequences have to be set as a gap-open penalty of 10 and a gap extension penalty of 0.5. The homology or percent identity between the two aligned sequences is calculated as follows: the number of corresponding positions in the alignment showing an identical amino acid in both sequences divided by the total length of the alignment after subtraction of the total number of gaps in the alignment.

The percent identity as herein defined is obtainable from NEEDLE and is labelled in the output of the program as "identity".

The term "analogue" of a peptide is used herein in particular for peptides that are structural analogues and/or functional analogues of said peptide. Functional analogues have a same in vivo target (e.g. the same target receptor on a cell membrane); structural analogues have a high similarity in amino acid sequence. Functional analogues of a peptide may have a relatively low amino acid sequence identity, e.g. of about 50% or less over the full amino acid sequence, yet a high sequence identity (and thus a high structural similarity) with the peptide of which they are an analogue in a segment of the amino acid sequence, such as near the N-terminal part or near the C-terminal part. In particular, a structural analogue comprises an amino acid sequence that has at least 80%, preferably at least 85%, more preferably at least 90% sequence identity, even more preferably at least 95% sequence identity with the amino acid sequence of the peptide of which a peptide is an analogue. The term "analogue" is used herein when referring to the target peptide of the coupling reactions.

The term "variant" or "mutant" of an enzyme is used herein for enzymes that are structural analogues of an enzyme, having at least one mutation or mutated amino acid relative to such enzyme. In particular, a subtilisin BPN' variant is an enzyme having at least one mutation relative to the sequence of SEQ ID NO: 2.

Surprisingly, it was found that compared with the subtilisin BPN' variants or homologues thereof known from WO2016/06913 a mutation at position L96 significantly improves the reaction rate and the coupling efficiency in reactions according to the invention. Hence, according to the invention L96 is a preferred position for a mutation. A similar improvement can be achieved by a mutation at position D99, A223 or S224. Accordingly, D99, A223 and S224 each are preferred positions for a mutation.

Accordingly, the present invention provides a subtilisin BPN' variant or homologue thereof, having at least 80% sequence identity to SEQ ID NO: 2, which represents the sequence of subtilisin BPN', comprising a deletion of the amino acids at positions 75-83; and a mutation at the amino acid position S221, the mutation being S221C or S221 selenocysteine, preferably S221C; characterized by at least one mutation at an amino acid position selected from the group consisting of L96, D99, A223 and S224, wherein the amino acid positions are defined according to the sequence of subtilisin BPN' represented by SEQ ID NO: 2 or a homologue sequence thereof.

The amino acid sequence of subtilisin BPN' is given in SEQ ID NO: 2 (mature form). The nucleic acid sequence encoding for subtilisin BPN' amino acids –107 to 275 is given in SEQ ID NO: 1.

SEQ ID NO: 3 shows a subtilisin BPN' variant according to the invention with deletion of the amino acids corresponding to positions 75-83 (so called $Ca^{2+}$ binding loop), with the S221 mutation (denoted as S221C), with the amino acids at positions L96, D99, A223 and S224 all marked as X denoting in this position any proteinogenic amino acid, thereby including those according to SEQ ID NO: 2 (if the position is not mutated), provided that at least one X at one of these positions is an amino acid not present in SEQ ID NO: 2 at said position, i.e. at least one X is a mutation. Further preferred enzymes may comprise one or more additional mutations, in particular one or more further mutations as identified elsewhere herein below.

In particular, the invention provides an isolated enzyme. Herein the term "isolated" means that it was isolated from the organism wherein it has been expressed—typically a recombinant organism, if it has been produced in an organism—or from the reaction medium in which it has been synthesized.

In particular, an enzyme according to the present invention is considered isolated either in the crude form or substantially purified by any suitable technique such as, for example, the single-step purification method disclosed in Smith and Johnson, Gene 67:31-40 (1988).

An enzyme according to the present invention can be provided in at least substantially pure form, wherein the term "substantially pure enzyme" refers to an enzyme of at least 75 wt. %, preferably of more than 80 wt. % purity.

The enzyme may also be provided in a mixture with one or more other components, e.g. in the form of a stock solution, preferably in an aqueous buffer solution.

An enzyme according to the present invention may comprise a terminal His tag, preferably a 6-His tag.

Surprisingly, it was also found, that when combining two or three or all four mutations at the above-described positions L96, D99, A223, and S224, a cumulative effect was observed.

Thus, in preferred embodiments, the subtilisin BPN' variant or homologue thereof according to the present invention comprises one of the following:
one mutation at an amino acid position selected from the group consisting of L96, D99, A223 and S224; or
two mutations at amino acid positions selected from the group consisting of L96 and D99; L96 and A223; L96 and S224; D99 and A223; D99 and S224; and, A223 and S224; or
three mutations at amino acid positions selected from the group consisting of L96, D99 and A223; L96, D99 and S224; L96, A223 and S224; and, D99, A223 and S224; or
four mutations at amino acid positions L96, D99, A223 and S224.

Among the several possible mutations at position L96, eight specific mutations, namely L96I, L96V, L96M, L96T, L96C, L96Q, L96A and L96S perform particularly well. These are particularly preferred mutations, L96I and L96V are even more preferred.

In another embodiment, the subtilisin BPN' variant or homologue thereof according to the invention comprises a mutation at position L96, preferably selected from the group consisting of L96I, L96V, L96M, L96T, L96C, L96Q, L96A and L96S, more preferably from the group consisting of L96I and L96V.

Among the several possible mutations at position D99, fifteen mutations, namely D99R, D99K, D99G, D99F, D99T, D99S, D99N, D99Q, D99Y, D99M, D99I, D99H, D99E, D99L and D99W perform particularly well, and are therefore preferred. Particularly good results were obtained with mutations D99R, D99K and D99G, which are therefore even more preferred.

In yet another embodiment, the subtilisin BPN' variant or homologue thereof according to the invention comprises a mutation at position D99, preferably selected from the group consisting of D99R, D99K, D99G, D99F, D99T, D99S, D99N, D99Q, D99Y, D99M, D99I, D99H, D99E, D99L and D99W, more preferably from the group consisting of D99R, D99K and D99G.

Among the several possible mutations at position A223, mutations A223S and A223G perform particularly well and are therefore more preferred.

In a further embodiment, the subtilisin BPN' variant or homologue thereof according to the invention comprises a mutation at position A223, preferably selected from the group consisting of A223S and A223G.

Among the several possible mutations at position S224, mutations S224M, S224Q, S224E, S224H, S224L, S224V and S224I are particularly preferred, as these show particularly good results.

Thus, in another embodiment, the subtilisin BPN' variant or homologue thereof according to the invention comprises a mutation at position S224, preferably selected from the group consisting of S224M, S224Q, S224E, S224H, S224L, S224V and S224I.

In a preferred embodiment, the subtilisin BPN' variant or homologue thereof according to the invention comprises at least one, preferably two or three or four mutation(s) selected from the group consisting of L96I, L96V, L96M, L96T, L96C, L96Q, L96A, L96S, D99R, D99K, D99G, D99F, D99T, D99S, D99N, D99Q, D99Y, D99M, D99I, D99H, D99E, D99L, D99W, A223S, A223G, S224M, S224Q, S224E, S224H, S224H, S224L, S224V and S224I; more preferably the combination of mutations is selected from the group consisting of L96V and D99R; L96I and D99R; L96I and D99K: L96I and A223S; L96I and S224V; L96V, D99R and A223S; L96V, D99R and S224V; L96I, D99R and A223S; L96I, D99R and S224V; L96I, D99K and A223S; L96I, D99K and S224V; L96V, D99R, A223S and S224V; L96I, D99R, A223S and S224V; L96V, D99K, A223S and S224V; and, L96I, D99K, A223S and S224V.

Preferred combinations of 2 mutations are selected from the group consisting of L96V and D99R; L96I and D99R; L96I and D99K: L96I and A223S; and, L96I and S224V.

Preferred combinations of 3 mutations are selected from the group consisting of L96V, D99R and A223S; L96V, D99R and S224V; L96I, D99R and A223S; L96I, D99R and S224V; L96I, D99K and A223S; L96I, A223S and S224V; and, L96I, D99K and S224V.

Preferred combinations of 4 mutations are selected from the group consisting of L96V, D99R, A223S and S224V; L96I, D99R, A223S and S224V; L96V, D99K, A223S and S224V; and, L96I, D99K, A223S and S224V.

An enzyme according to the invention may have further mutations compared to subtilisin BPN', provided that it has ligase and/or cyclase activity as defined above; preferably, one or more further mutations as described elsewhere herein.

An enzyme according to the invention preferably further comprises a mutation at the amino acid position corresponding to P225, which might be advantageous for increasing the S/H ratio in a coupling or cyclization reaction of interest.

Accordingly, the present invention provides a subtilisin BPN' variant or homologue thereof, further comprising a mutation at amino acid position P225, preferably selected from the group consisting of P225N, P225D, P225S, P225C, P225G, P225A, P225T, P225V, P225I, P225L, P225H and P225Q, more preferably selected from the group consisting of P225N, P225D, P225S, P225C, P225G, P225A and P225T, even more preferably corresponding to P225N or P225D.

For a good enzyme stability, the subtilisin BPN' variant or homologue thereof according to the invention preferably further comprises one or more mutations at amino acid positions selected from the group consisting of Q2, S3, P5, S9, I31, K43, M50, A73, G169, S188, Q206, N212, T254 and Q271. Preferably said one or more further mutations are selected from the group consisting of Q2K, S3C, P5S, S9A, I31L, K43N, M50F, A73L, G169A, S188P, Q206C, N212G, T254A and Q271E.

Accordingly, the present invention provides a subtilisin BPN' variant or homologue thereof, further comprising at least 6, preferably at least 8, more preferably at least 10, even more preferably at least 12 mutations at amino acid positions selected from the group consisting of Q2, S3, P5, S9, I31, K43, M50, A73, G169, S188, Q206, N212, T254 and Q271, wherein such mutations are preferably selected from the group consisting of Q2K, S3C, P5S, S9A, I31L, K43N, M50F, A73L, G169A, S188P, Q206C, N212G, T254A and Q271E.

Also preferably, the subtilisin BPN' variant or homologue thereof according to the invention further comprises one or more mutations at amino acid positions selected from the group consisting of S33, N62, E156, G166, Y217, N218 and F189, such mutation being preferably selected from the group consisting of S33T, N62A, N62R, N62K, E156S, E156N, E156K, E156R, G166S, G166E, G166D, Y217L, Y217H, Y217R, N218S, N218D and F189W. More preferred combinations of mutations are E156K and G166E; and E156K and G166D.

In another preferred embodiment, the subtilisin BPN' variant or homologue thereof according to the invention further comprises at least one mutation at the amino acid positions M222 and Y217, or pairs of mutations, wherein the single mutation is preferably selected from the group consisting of M222P, M222G, M222H, Y217H, Y217G, Y217F, Y217L, and Y217R, and wherein the pairs of mutations are preferably selected from the group consisting of M222P and Y217H; M222P and Y217G; M222G and Y217F; M222G and Y217G; M222G and Y217L; and, M222H and Y217R.

In a further preferred embodiment, the subtilisin BPN' variant or homologue thereof according to the invention further comprises the mutations Q2K, S30, P5S, S9A, I31L, K43N, M50F, N62A, A73L, E156N, G166E, G169A, S188P, F189W, Q206C, N212G, Y217H, N218D, M222P, P225N, T254A, and Q271E.

In yet another preferred embodiment, the subtilisin BPN' variant or homologue thereof according to the invention further comprises the mutations Q2K, S30, P5S, S9A, I31L, K43N, M50F, A73L, I107V, E156S, G166S, G169A, S188P, F189W, Q206C, N212G, Y217H, N218S, M222P, P225N, T254A and Q271E.

In a more preferred embodiment, the subtilisin BPN' variant or homologue thereof according to the invention comprises the mutations Q2K, S30, P5S, S9A, I31L, K43N, M50F, N62A, A73L, E156K, G166D, G169A, S188P, F189W, Q206C, N212G, Y217R, N218D, M222H, P225N, T254A, Q271E and a combination of mutations selected from the group consisting of L96I and D99R; L96I and D99K; L96I and A223S; L96I and S224V; L96I, A223S and S224V; L96I, D99R and S224V; L96I, D99R, A223S and S224V; L96I, D99K and A223S; L96I, D99K and S224V; and, L96I, D99K, A223S and S224V.

Other subtilisins, in particular subtilisin BPN' homologues, can be used instead of subtilisin BPN', as template enzymes from which enzymes according to the invention can be derived by mutagenesis. Such variants according to the invention have at least the deletions of the amino acids corresponding to L75 until and including G83 of subtilisin BPN'; have cysteine or selenocysteine at a position corresponding to position 221 in subtilisin BPN' and have at least one of said further mutations at an amino acid position selected from the group consisting of L96, D99, A223 and S224, in all the possible combinations as defined above.

Therefore, in one embodiment, the present invention provides a subtilisin BPN' variant or homologue thereof, having at least 80% sequence identity, preferably at least 85%, more preferably at least 90% or even more preferably at least 95% identity to SEQ ID NO: 2; comprising a deletion of the amino acids at positions 75-83, and a mutation at the amino acid position S221, the mutation being S221C or S221 selenocysteine, preferably S221C; and characterized by at least one mutation at an amino acid position selected from the group consisting of L96, D99, A223 and S224, wherein the amino acid positions are defined according to the sequence of subtilisin BPN' represented by SEQ ID NO: 2 or a homologue sequence thereof, and wherein such variant or homologue thereof has ligase and/or cyclase activity with an increased reaction rate and coupling efficiency.

The enzymes of the present invention are generally produced by recombinant methods, preferably by expression of a subtilisin BPN' DNA which has been mutated such that upon expression it results in a subtilisin BPN' variant of the invention which is enzymatically active.

Accordingly, the invention further provides a recombinant method for preparing the enzyme according to the invention, said method comprising the steps of:
a) providing a recombinant host cell functionally expressing a gene encoding the enzyme, e.g. bacterial cells such as E. coli or Bacillus;
b) culturing said host cell under conditions which provide for the expression of the enzymatically active enzyme; and
c) recovering the expressed enzyme from said microbial host.

The invention further provides a recombinant polynucleotide comprising a sequence which encodes for an enzyme according to the invention.

The invention further provides a host cell, comprising a polynucleotide according to the invention, which polynucleotide is capable of expressing the enzyme.

The subtilisin BPN' variant or homologue thereof according to the invention catalyzes the formation of an amide bond. Accordingly, the invention provides a method for enzymatically synthesizing a peptide, comprising a step of coupling (a) a peptide C-terminal (thio)ester with (b) a peptide nucleophile having an N-terminal unprotected amine, wherein the coupling is preferably performed in an aqueous solution, and wherein the coupling is catalyzed by a subtilisin BPN' variant or homologue thereof, having at least 80% sequence identity to SEQ ID NO: 2, comprising a deletion of the amino acids at positions 75-83, and a mutation at the amino acid position S221, the mutation being S221C or S221 selenocysteine, preferably S221C; and
characterized by having at least one mutation at an amino acid position selected from the group consisting of L96, D99, A223 and S224,
wherein the amino acid positions are defined according to the sequence of subtilisin BPN' represented by SEQ ID NO: 2 or a homologue sequence thereof, and wherein such variant or homologue thereof has ligase and/or cyclase activity with an increased reaction rate and coupling efficiency.

The use of an enzyme according to the invention extends beyond the catalysis of the cyclization reaction of a peptide and/or the coupling of a peptide C-terminal (thio)ester to a peptide nucleophile, such as described above. The subtilisin BPN' variant or homologue thereof may be used in the formation of an amide bond, other than a peptide bond, although its use related to a peptide bond is particularly preferred.

In the method according to the invention, the reaction is typically performed in an aqueous medium, preferably comprising a buffer.

The water content of the solvent in the aqueous medium usually is in the range 10-100 vol %. Particularly good results have been achieved in an aqueous medium, wherein the solvent comprises 70-100 vol % water, more in particular 90-100 vol. %, 95-100 vol. % or 98-100 vol. % water. More preferably the solvent is water only.

Additional suitable solvents are water miscible co-solvents such as N,N-dimethylformamide (DMF), N-methylpyrrolidinone (NMP), N,N-dimethylacetamide (DMA), dimethylsulphoxide (DMSO), acetonitrile (ACN), or an ether, such as tetrahydrofuran (THF), 2-methyl-tetrahydrofuran (Me-THF) or 1,2-dimethoxyethane, or a (halogenated) alcohol, such as methanol, ethanol, isopropanol, tert-butanol, 2,2,2-trifluoroethanol (TFE), 1,1,1,3,3,3-hexafluoroisopropanol, or a mixture thereof. Depending on the stability of the subtilisin BPN' variant and the solubility of the peptide substrates, the amount of co-solvent is preferably below 30 vol %.

The pH of the buffered aqueous medium for the coupling or cyclization reaction may be at least 5, in particular at least 6, preferably at least 7. A desired pH is usually less than 11, in particular less than 10, even more preferably less than 9. More preferably, the pH for the coupling or cyclization reaction is between about 7 and 9.

In principle, any buffer maintaining the pH in the range from 5 to 11 is suitable. Suitable buffers are known to a person skilled in the art, as also described, for instance, in Good, N. E., et al. (1966) Hydrogen Ion Buffers for Biological Research, Biochemistry 5(2), 467-477. Particularly good results have been achieved for instance with a Good's buffer, such as tricine. The concentration of the buffer may be chosen within wide limits, e.g. in the range of 10-1000 mM, in particular in the range of 25-500 mM, more in particular in the range of 50-250 mM.

It may be advantageous to add additives to the aqueous solution in order to improve the solubility of the peptide fragments or to improve the reaction yield. Such additives may be salts or organic molecules, such as for instance guanidinium hydrochloride, urea, sodium dodecasulphate or Tween.

In principle the temperature during the coupling or cyclization reaction was not critical, as long as a temperature was chosen at which the enzyme to be used showed sufficient activity and stability. Such a temperature can be routinely determined. Generally, the temperature may be at least 10° C. or more, or at least 20° C. or more, or 70° C. or less, in particular 50° C. or less. Preferably, the temperature during the coupling or cyclization reactions according to the invention is in the range of 20-50° C.

The peptide C-terminal ester or thioester typically used was an activated (thio)ester, i.e. it contains a carboxy ester or carboxy thioester group that can take part in the reaction. In principle, any substituted or unsubstituted alkyl or any substituted or unsubstituted aryl (thio)ester can be used. Typical examples of (thio)esters which can take part in the reaction are methyl-, ethyl-, propyl-, isopropyl-, phenyl-, benzyl- (such as p-carboxy-benzyl-), 2,2,2-trichloroethyl-, 2,2,2-trifluoroethyl-, cyanomethyl- and carboxyamidomethyl-(thio)esters.

Particularly good results have been obtained with carboxyamidomethyl-type esters (Cam-esters) represented by the formula peptide-(C=O)O—CX$_1$X$_2$—C(=O)N—R$_1$R$_2$, wherein each X$_1$ and X$_2$ independently represents a hydrogen atom or an alkyl group, being preferably both hydrogen atoms; and wherein each R$_1$ and R$_2$ independently represents a hydrogen atom or an alkyl group or an amino acid or a peptide residue with a C-terminal carboxyamide or carboxylic acid functionality, optionally protected on their side-chain/s. Herein, each alkyl group may independently represent a substituted or unsubstituted C1-C7 alkyl group, preferably a substituted or unsubstituted linear C1-C6 alkyl group, more preferably a substituted or unsubstituted linear C1-C3 alkyl group, and most preferably a methyl group. Preferably, both R$_1$ and R$_2$ represent a hydrogen atom, or R$_1$ represents a hydrogen atom and R$_2$ represents an amino acid or peptide residue with a C-terminal carboxyamide or carboxylic acid functionality, optionally protected on their side-chain/s. It is especially advantageous to use a Cam-AA1-AA2-ester, wherein R$_2$ is a dipeptide, wherein AA1 is the first amino acid and AA2 is the second amino acid. Herein AA1 is a hydrophobic amino acid, such as alanine, valine, leucine, isoleucine, phenylalanine, methionine or tryptophan. AA2 is a basic amino acid, such as arginine or lysine. The AA1 and the AA2 typically have a free side-chain, i.e. that is free of a protective group or another residue. Particularly preferred are Cam esters peptide-(C=O)O—CH$_2$—C(=O)N-Phe-Arg-NH$_2$/N-Phe-Lys-NH$_2$.

Particularly good results have also been obtained with carboxyl substituted benzyl esters, in particular with p- or m-carboxyl substituted benzyl esters represented by the formula peptide-(C=O)—O—CH$_2$—C$_6$H$_4$—(C=O)E, wherein E represents a hydroxy group, a carboxylate salt such as for instance an ammonium salt, or an amino acid or a peptide residue with a C-terminal carboxyamide or carboxylic acid functionality, optionally protected on the amino acid/s side-chain/s. Good results have also been obtained with p- or m-carboxyl substituted benzyl esters represented by the formula peptide-(C=O)—O—CH$_2$—C$_6$H$_4$—(C=O)E, wherein E is defined as above and in which one or more hydrogen atoms in the phenyl ring (C$_6$H$_4$ in the above formula) are replaced by a substituent, such as hydroxy, alkoxy, aryloxy or halogen.

The peptide C-terminal (thio)ester can be N-terminally unprotected or N-terminally protected. The term 'N-terminal protection' is used herein to indicate that an N-terminal amine group of a peptide is provided with a protective group, generally at least substantially protecting the N-terminal amine group from being coupled to a C-terminal carboxylic group of another peptide or of the same peptide molecule. Preferably, the peptide C-terminal (thio)ester is not N-terminally protected.

The peptide C-terminal (thio)esters used in the present invention can be synthesized using solid phase synthesis in high yield and purity without racemization. An additional advantage of the use of (thio)esters of the carboxyamidomethyl type, wherein R$_1$ represents a hydrogen atom and R$_2$ represents an amino acid or peptide residue with a C-terminal carboxylic acid functionality, optionally protected on the side-chain functionality of the amino acid or on one or more of the side-chain functionalities of the amino acids, is that their activated C-terminal (thio)ester group can be synthesized by solid phase synthesis using common solid supports like 2-chlorotritylchloride resin (CTC resin), Rink resin and Wang resin, as also described in Protocols 1-2 of the present disclosure.

The peptide C-terminal (thio)esters can also be synthesized by solution phase synthesis or fermentation using a microorganism. A reliable method to obtain peptide (thio) esters using fermentation is via so-called intein expression (see for instance E. K. Lee, Journal of Chemical Technology and Biotechnology, 2010, 9, 11-18). Different intein expression systems kits are commercially available (for instance the IMPACT™ kit). Other methods for the fermentative production of peptide (thio)esters are known in the art.

The amino acids of the peptide C-terminal (thio)ester (i.e. the acyl donor thioester) may in principle be selected from any amino acid, proteinogenic or non-proteinogenic The optionally N-terminal protected peptide C-terminal (thio) ester may be represented by a compound of Formula I:

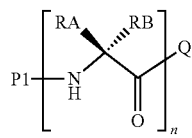

Formula I wherein Q represents an OR or SR moiety, wherein R may represent a substituted or unsubstituted alkyl or a substituted or unsubstituted aryl group; and P1 stands for a hydrogen or an N-terminal protecting group. Suitable N-terminal protecting groups are those groups which can be used for the synthesis of peptides, including carbamate or acyl type protecting groups, for instance Cbz (benzyloxycarbonyl), Boc (tert-butyloxycarbonyl), For (formyl), Fmoc (9-fluorenylmethoxycarbonyl), Smoc (2,7-disulfo-9-fluorenylmethoxycarbonyl), PhAc (phenacetyl) and Ac (acetyl). The groups For, PhAc and Ac may be introduced and cleaved enzymatically using the enzymes Peptide Deformylase, PenG acylase or Acylase, respectively. Chemical cleavage methods for all the mentioned protecting groups are known in the art.

Herein, n is an integer with a value of at least 2 and depending on the length of the peptide C-terminal (thio) ester.

Herein, each RA and each RB independently represent a hydrogen atom or an amino acid side-chain, depending on the amino acid involved. Optionally, one or more of the side-chains may comprise a protecting group.

The amino acids of the peptide nucleophile (i.e. the acyl acceptor) may in principle be selected from any amino acid, proteinogenic or non-proteinogenic. In particular, the peptide nucleophile may be represented by a compound of Formula II:

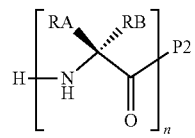

Formula II wherein n, RA and RB are as defined above for Formula I, mutatis mutandis.

The peptide nucleophile can be C-terminally unprotected or C-terminally protected. The term 'C-terminal protection' is used herein to indicate that a C-terminal carboxylic group of a peptide, in particular of the peptide nucleophile, is provided with a protective group, generally substantially protecting the carboxylic group from being coupled to an N-terminal amine group of another peptide or of the same peptide molecule. Herein, P2 represents an amine moiety or an OR moiety. In case P2 represents an amine moiety, the amine moiety may be represented by the formula NR3R4, in which R3 and R4 may each individually represent any substituted or unsubstituted alkyl or any substituted or unsubstituted aryl group. Preferably, one out of R3 and R4 is a hydrogen atom and the other a substituted or unsubstituted alkyl group; more preferably, R3 and R4 are both hydrogen atoms. In case P2 represents an OR moiety, R may represent a carboxylic acid protective group or a cation, for instance a monovalent cation, such as a tri- or tetrasubstituted ammonium ion or an alkaline metal cation or an H. In case R is a carboxylic acid protective group, OR may in particular be an ester, with R being preferably a tertiary-alkyl group, like for instance tert-butyl, 2-methyl-2-butyl and 2,3-dimethyl-2-butyl.

The peptide nucleophile may be synthesized using methods known in the art, such as solid-phase synthesis, solution phase synthesis or by fermentation using a microorganism.

In one embodiment, one or more side-chains of the peptide C-terminal (thio)ester and/or of the peptide nucleophile may comprise a protecting group, which can be selected among suitable protecting groups known in the art. Carboxylic acid groups can for instance be protected with a cyclohexyl, benzyl or allyl group; amine functionalities can for instance be protected with an allyloxycarbonyl group or a trifluoroacetyl group. In a preferred embodiment, the peptide C-terminal (thio)ester and the peptide nucleophile are free from side-chain protecting groups.

Due to the high S/H ratio that can be achieved with the methods according to the invention, a large excess of the peptide C-terminal (thio)ester or of the peptide nucleophile is generally not needed to reach a high yield in the coupling reaction. A suitable ratio of (a) the peptide C-terminal (thio)ester to (b) the peptide nucleophile is between 1:5 and 5:1, preferably in the range of 1:3 to 3:1, more preferably in the range of 1.0:2.5 to 2.5:1.0, in particular in the range of 1:2 to 2:1, more in particular in the range of 1:1.5 to 1.5:1. An about stoichiometric ratio has been found as particularly preferred.

The invention provides in particular an enzyme which allows efficient preparation of biologically active peptides by coupling of peptide fragments. These peptides include glucagon, glp-1, glp-2, and their analogues, such as dasiglucagon, exenatide, liraglutide, semaglutide, lixisenatide, teduglutide, glepaglutide, dulaglutide, elsiglutide, and the like; thymosin-alpha-1, thymosin-alpha-1 analogues, teriparatide, salmon calcitonin, bivalirudin, and peptides comprising the sequence of any of these and at least one further amino acid. Preferably the glp-1 analogues are liraglutide and semaglutide; the glp-2 analogues are preferably glepaglutide and elsiglutide.

Accordingly, the invention provides a method for enzymatically synthesizing a peptide selected from the group consisting of liraglutide, semaglutide, dasiglucagon, teduglutide, glepaglutide, elsiglutide, teriparatide, salmon calcitonin, bivalirudin and their analogues.

The present invention further provides the use of an enzyme according to the invention as a catalyst in a method of enzymatically synthesizing peptides of pharmacological interest, including liraglutide, semaglutide, dasiglucagon, teduglutide, glepaglutide, elsiglutide, teriparatide, salmon calcitonin, bivalirudin and their analogues, wherein dasiglucagon, glepaglutide, elsiglutide, teriparatide, salmon calcitonin and bivalirudin are particularly preferred. In the methods according to the invention it is preferred that the analogue is the structural analogue.

Liraglutide (SEQ ID NO: 6) is a GLP-1 analogue substituted on the epsilon-amino group of the lysine in position with a Glu-spaced palmitic acid. Thus, liraglutide has the formula H-His-Ala-Glu-Gly-Thr-Phe-Thr-Ser-Asp-Val-Ser-Ser-Tyr-Leu-Glu-Gly-Gln-Ala-Ala-Lys(Pal-γ-Glu)-Gly-Phe-Ie-Aa-Trp-Leu-Val-Arg-Gly-Arg-Gly-OH. In Lys(Pal-gamma-Glu) the epsilon-amino-group of the Lys residue is linked with the gamma-Glu carboxylic side-chain and the Glu is N-palmitoylated.

Semaglutide (SEQ ID NO: 7) is also a GLP-1 analogue with a substitution on the epsilon-amino group of the lysine in position 20 and has the formula H-His-Aib-Glu-Gly-Thr-Phe-Thr-Ser-Asp-Val-Ser-Ser-Tyr-Leu-Glu-Gly-Gln-Ala-Ala-Lys(AEEA-AEEA-gamma-Glu-17-carboxyheptadecanoyl)-Glu-Phe-Ie-Aa-Trp-Leu-Val-Arg-Gy-Arg-Gly-OH, wherein AEEA-AEEA-gamma-Glu-17-carboxyheptadecanoyl is N-(17-carboxy-1-oxoheptadecyl)-L-gamma-glutamyl-2-[2-(2-aminoethoxy)ethoxy]acetyl-2-[2-(2-aminoethoxy)ethoxy]acetyl.

Dasiglucagon (SEQ ID NO: 8) is a novel peptide analogue of human glucagon, having the formula H-His-Ser-Gln-Gly-Thr-Phe-Thr-Ser-Asp-Tyr-Ser-Lys-Tyr-Leu-Asp-Aib-Ala-Arg-Ala-Glu-Glu-Phe-Val-Lys-Trp-Leu-Glu-Ser-Thr-OH.

Glepaglutide (SEQ ID NO: 9) is a GLP-2 analogue, having the formula H-His-Gly-Glu-Gly-Thr-Phe-Ser-Ser-Glu-Leu-Ala-Thr-Ile-Leu-Asp-Ala-Leu-Ala-Ala-Arg-Asp-Phe-Ie-Ala-Trp-Leu-Ie-Ala-Thr-Lys-Ie-Thr-Asp-Lys-Lys-Lys- Lys-Lys-Lys-NH$_2$.

Elsiglutide (SEQ ID NO: 10) is a GLP-2 analogue, having the formula H-His-Gly-Glu-Gly-Ser-Phe-Ser-Ser-Glu-Leu-Ser-Thr-Ile-Leu-Asp-Ala-Leu-Ala-Ala-Arg-Asp-Phe-Ie-Ala-Trp-Leu-Ie-Ala-Thr-Lys-Ie-Thr-Asp-Lys-Lys-Lys- Lys-Lys-Lys-NH$_2$.

Teriparatide (SEQ ID NO: 11) is a recombinant human parathyroid hormone (rhPTH), having the formula H-Ser-Val-Ser-Glu-Ile-Gln-Leu-Met-His-Asn-Leu-Gly-Lys-His-Leu-Asn-Ser-Met-Glu-Arg-Val-Glu-Trp-Leu-Arg-Lys-Lys-Leu-Gln- Asp-Val-His-Asn-Phe-OH.

Calcitonin is a peptide hormone, in particular salmon calcitonin (SEQ ID NO: 12) has the formula H-Cys-Ser-Asn-Leu-Ser-Thr-Cys-Val-Leu-Gly-Lys-Leu-Ser-Gln-Glu-Leu-His-Lys-Leu-Gln-Thr-Tyr-Pro-Arg-Thr-Asn-Thr-Gly-Ser-Gly- Thr-Pro-NH$_2$, and further bears a disulfide bond between cysteines at positions 1 and 7.

Bivalirudin (SEQ ID NO: 13) is a thrombin inhibitor, having the formula H-D-Phe-Pro-Arg-Pro-Gly-Gly-Gly-Gly-Asn-Gly-Asp-Phe-Glu-Glu-Ile-Pro-Glu-Glu-Tyr-Leu-OH.

Methods for the preparation of dasiglucagon, glepaglutide, elsiglutide, teriparatide, salmon calcitonin and bivalirudin by enzymatic synthesis are not known in the art.

In a preferred embodiment, the subtilisin variants of the present invention efficiently catalyse the preparation of dasiglucagon, glepaglutide, elsiglutide, teriparatide, salmon calcitonin, bivalirudin, liraglutide and semaglutide involving the coupling reaction of specific peptide fragments, which are thus preferred.

Accordingly, in one embodiment, the present invention provides a method for enzymatically synthesizing dasiglucagon, (SEQ ID NO: 8), comprising a step of coupling (a) a peptide C-terminal (thio)ester with (b) a peptide nucleophile having an N-terminal unprotected amine, wherein the coupling is catalyzed by a subtilisin BPN' variant or a homologue thereof according to the present invention, as described above and as defined in claim 1 and in the dependent claims thereof.

The present invention also provides a method for synthesizing a peptide comprising the sequence of dasiglucagon (SEQ ID NO: 8), i.e. His-Ser-Gln-Gly-Thr-Phe-Thr-Ser-Asp-Tyr-Ser-Lys-Tyr-Leu-Asp-Aib-Ala-Arg-Ala-Glu-Glu-Phe-Val-Lys-Trp-Leu-Glu-Ser-Thr, the method comprising a step of coupling: either (a) a peptide C-terminal (thio)ester comprising a first peptide fragment with the sequence His-Ser-Gln-Gly-Thr-Phe-Thr-Ser-(thio)ester (SEQ ID NO: 15); with (b) a peptide nucleophile fragment having an N-terminally unprotected amine comprising a second peptide fragment with the sequence H-Asp-Tyr-Ser-Lys-Tyr- Leu-Asp-Aib-Ala-Arg-Ala-Glu-Glu-Phe-Val-Lys-Trp-Leu-Glu-Ser-Thr (SEQ ID NO: 16); or (c) a peptide C-terminal (thio)ester comprising a first peptide fragment with the sequence His-Ser-Gln-Gly-Thr-Phe-Thr-Ser-Asp(thio)ester (SEQ ID NO: 17); with (d) a peptide nucleophile fragment having an N-terminally unprotected amine comprising a second peptide fragment with the sequence H-Tyr-Ser-Lys-Tyr-Leu-Asp-Aib-Ala-Arg-Ala-Glu-Glu-Phe-Val-Lys-Trp-Leu-Glu-Ser-Thr (SEQ ID NO: 18); or (e) a peptide C-terminal (thio)ester comprising a first peptide fragment with the sequence His-Ser-Gln-Gly-Thr-Phe-Thr-Ser-Asp-Tyr(thio)ester (SEQ ID NO: 19); with (f) a peptide nucleophile fragment having an N-terminally unprotected amine comprising a second peptide fragment with the sequence H-Ser-Lys-Tyr-Leu-Asp-Aib-Ala-Arg-Ala-Glu-Glu-Phe-Val-Lys-Trp-Leu-Glu-Ser-Thr (SEQ ID NO: 20);

wherein the coupling is catalyzed by a subtilisin variant of the present invention.

In another embodiment, the present invention provides a method for enzymatically synthesizing glepaglutide (SEQ ID NO: 9), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

The present invention also provides a method for synthesizing a peptide comprising the sequence of glepaglutide (SEQ ID NO: 9), i.e. His-Gly-Glu-Gly-Thr-Phe-Ser-Ser-Glu-Leu-Ala-Thr-Ile-Leu-Asp-Ala-Leu-Ala-Ala-Arg-Asp-Phe-Ie-Ala-Trp-Leu-Ie-Ala-Thr-Lys-Ile-Thr-Asp-Lys-Lys-Lys-Lys-Lys-Lys, the method comprising a step of coupling: either (a) a peptide C-terminal (thio)ester comprising a first peptide fragment with the sequence His-Gly-Glu-Gly-Thr-Phe-Ser-Ser-Glu-Leu-Ala-(thio)ester (SEQ ID NO: 21); with (b) a peptide nucleophile fragment having an N-terminally unprotected amine comprising a second peptide fragment with the sequence H-Thr-Ile-Leu-Asp-Ala-Leu-Ala-Ala-Arg-Asp-Phe-Ie-AIa-Trp-Leu-Ie-Ala-Thr-Lys-Ile-Thr-Asp-Lys-Lys-Lys-Lys-Lys (SEQ ID NO: 22); or (c) a peptide C-terminal (thio)ester comprising a first peptide fragment with the sequence His-Gly-Glu-Gly-Thr-Phe-Ser-Ser-Glu-Leu-Ala-Thr-Ile-Leu-Asp-Ala-(thio)ester (SEQ ID NO: 23); with (d) a peptide nucleophile fragment having an N-terminally unprotected amine comprising a second peptide fragment with the sequence H-Leu-Ala-Ala-Arg-Asp-Phe-Ile-AIa-Trp-Leu-Ie-Ala-Thr-Lys-Ile-Thr-Asp-Lys-Lys-Lys-Lys-Lys (SEQ ID NO: 24);

wherein the coupling is catalyzed by a subtilisin variant of the present invention.

In a further embodiment, the present invention provides a method for enzymatically synthesizing elsiglutide (SEQ ID NO: 10), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

The present invention also provides a method for synthesizing a peptide comprising the sequence of elsiglutide (SEQ ID NO: 10), i.e. His-Gly-Glu-Gly-Ser-Phe-Ser-Ser-Glu-Leu-Ser-Thr-Ie-Leu-Asp-Ala-Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys, the method comprising a step of coupling: either (a) a peptide C-terminal (thio)ester comprising a first peptide fragment with the sequence His-Gly-Glu-Gly-Ser-Phe-Ser-Ser-Glu-Leu-Ser-(thio)ester (SEQ ID NO: 25); with (b) a peptide nucleophile fragment having an N-terminally unprotected amine comprising a second peptide fragment with the sequence H-Thr-Ile-Leu-Asp-Ala-Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys (SEQ ID NO: 26); or (c) a peptide C-terminal (thio)ester comprising a first peptide fragment with the sequence His-Gly-Glu-Gly-Ser-Phe-Ser-Ser-Glu-Leu-Ser-Thr-Ile-Leu-Asp-Ala-(thio)ester (SEQ ID NO: 27); with (d) a peptide nucleophile fragment having an N-terminally unprotected amine comprising a second peptide fragment with the sequence H-Leu-Ala-Ala-Arg-Asp-Phe-Ile-AIa-Trp-Leu-Ie-Ala-Thr-Lys-Ile-Thr-Asp-Lys-Lys-Lys-Lys-Lys-Lys (SEQ ID NO: 28);

wherein the coupling is catalyzed by a subtilisin variant of the present invention.

In yet another embodiment, the present invention provides a method for enzymatically synthesizing teriparatide (SEQ ID NO: 11), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

The present invention further provides a method for synthesizing a peptide comprising the sequence of teriparatide (SEQ ID NO: 11), i.e. Ser-Val-Ser-Glu-Ile-Gln-Leu-Met-His-Asn-Leu-Gly-Lys-His-Leu-Asn-Ser-Met-Glu-Arg-Val-Glu-Trp-Leu-Arg-Lys-Lys-Leu-Gln-Asp-Val-His-Asn-Phe, the method comprising a step of coupling:

(a) a peptide C-terminal (thio)ester comprising a first peptide fragment with the sequence Ser-Val-Ser-Glu-Ile-Gln-Leu-Met-His-Asn-Leu-(thio)ester (SEQ ID NO: 29); with (b) a peptide nucleophile fragment having an N-terminally unprotected amine comprising a second peptide fragment with the sequence H-Gly-Lys-His-Leu-Asn-Ser-Met-Glu-Arg-Val-Glu-Trp-Leu-Arg-Lys-Lys-Leu-Gln-Asp-Val-His-Asn-Phe (SEQ ID NO: 30);

wherein the coupling is catalyzed by a subtilisin variant of the present invention.

In a preferred embodiment, the method for enzymatically synthesizing teriparatide comprises a step of coupling (a) a peptide C-terminal (thio)ester with (b) a peptide nucleophile having an N-terminal unprotected amine, wherein the coupling is catalyzed by a subtilisin BPN' variant or a homologue thereof according to the present invention, and wherein the peptide C-terminal (thio)ester is N-terminally protected.

In another embodiment, the present invention provides a method for enzymatically synthesizing salmon calcitonin (SEQ ID NO: 12), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

The present invention also provides a method for synthesizing a peptide comprising the sequence of salmon calcitonin (SEQ ID NO: 12), i.e. Cys-Ser-Asn-Leu-Ser-Thr-Cys-Val-Leu-Gly-Lys-Leu-Ser-Gln-Glu-Leu-His-Lys-Leu-Gln-Thr-Tyr-Pro-Arg-Thr-Asn-Thr-Gly-Ser-Gly-Thr-Pro, the method comprising a step of coupling: either
   (a) a peptide C-terminal (thio)ester comprising a first peptide fragment with the sequence Cys-Ser-Asn-Leu-Ser-Thr-Cys-Val-Leu-Gly-Lys-Leu-(thio)ester (SEQ ID NO: 31); with
   (b) a peptide nucleophile fragment having an N-terminally unprotected amine comprising a second peptide fragment with the sequence H-Ser-Gln-Glu-Leu-His-Lys-Leu-Gln-Thr-Tyr-Pro-Arg-Thr-Asn-Thr-Gly-Ser-Gly-Thr-Pro (SEQ ID NO: 32); or
   (c) a peptide C-terminal (thio)ester comprising a first peptide fragment with the sequence Cys-Ser-Asn-Leu-Ser-Thr-Cys-Val-Leu-Gly-Lys-Leu-Ser-Gln-Glu-Leu-His-Lys-Leu-Gln-(thio)ester (SEQ ID NO: 33); with
   (d) a peptide nucleophile fragment having an N-terminally unprotected amine comprising a second peptide fragment with the sequence H-Thr-Tyr-Pro-Arg-Thr-Asn-Thr-Gly-Ser-Gly-Thr-Pro (SEQ ID NO: 34);
   wherein the coupling is catalyzed by a subtilisin variant of the present invention.

In another embodiment, the present invention provides a method for enzymatically synthesizing bivalirudin (SEQ ID NO: 13), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

The present invention also provides a method for synthesizing a peptide comprising the sequence of bivalirudin (SEQ ID NO: 13), i.e. D-Phe-Pro-Arg-Pro-Gly-Gly-Gly-Gly-Asn-Gly-Asp-Phe-Glu-Glu-Ie-Pro-Glu-Glu-Tyr-Leu, the method comprising a step of coupling:
   (a) a peptide C-terminal (thio)ester comprising a first peptide fragment with the sequence D-Phe-Pro-Arg-Pro-Gly-Gly-Gly-Gly-Asn-Gly-(thio)ester (SEQ ID NO: 35); with
   (b) a peptide nucleophile fragment having an N-terminally unprotected amine comprising a second peptide fragment with the sequence H-Asp-Phe-Glu-Glu-Ile-Pro-Glu-Glu-Tyr-Leu (SEQ ID NO: 36);
   wherein the coupling is catalyzed by a subtilisin variant of the present invention.

In a preferred embodiment, the method for enzymatically synthesizing bivalirudin (SEQ ID NO: 13) comprises a step of coupling (a) a peptide C-terminal thioester with (b) a peptide nucleophile having an N-terminal unprotected amine, wherein the coupling is catalyzed by a subtilisin BPN' variant or a homologue thereof according to the present invention and as defined in claim 1 and in the dependent claims thereof.

In another embodiment, the present invention provides a method for enzymatically synthesizing liraglutide (SEQ ID NO: 6), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention, and as defined in claim 1 and in the dependent claims thereof.

In yet another embodiment, the present invention provides a method for enzymatically synthesizing semaglutide (SEQ ID NO: 7), comprising a step of coupling (a) a peptide C-terminal (thio)ester with (b) a peptide nucleophile having an N-terminal unprotected amine, and wherein the coupling is catalyzed by a subtilisin BPN' variant or a homologue thereof according to the present invention and as defined in claim 1 and in the dependent claims thereof.

The present invention provides a method for synthesizing a peptide comprising the sequence His-W-Glu-Gly-Thr-Phe-Thr-Ser-Asp-Val-Ser-Ser-Tyr-Leu-Glu-Gly-Gln-Ala-Ala-Z-Glu-Phe-Ile-Ala-Trp-Leu-Val-Arg-Gly-Arg-Gly (SEQ ID NO: 46), wherein
   W is Ala and Z is selected from the group consisting of Lys, Lys(PG), Lys(gamma-Glu), and Lys(Pal-gamma-Glu); for synthesizing liraglutide, or wherein
   W is Aib and Z is selected from the group consisting of Lys, Lys(PG), and Lys(AEEA-AEEA-gamma-Glu-17-carboxyheptadecanoyl) for synthesizing semaglutide;
The Method Comprising a Step of Coupling:
   (a) a peptide C-terminal (thio)ester comprising a first peptide fragment with the sequence His-W-Glu-Gly-Thr-Phe-Thr-Ser-Asp-Val-Ser-(thio)ester (SEQ ID NO: 37); with
   (b) a peptide nucleophile fragment having an N-terminally unprotected amine comprising a second peptide fragment with the sequence H-Ser-Tyr-Leu-Glu-Gly-Gln-Ala-Ala-Z-Glu-Phe-Ie-Ala-Trp-Leu-Val-Arg-Gly-Arg-Gly-OH (SEQ ID NO: 38);
   wherein the coupling is catalyzed by a subtilisin variant of the present invention, and wherein PG is a protecting group of Lys side-chain amino group.

In another preferred embodiment, the present invention provides a method for enzymatically synthesizing a peptide comprising the sequence of liraglutide (SEQ ID NO: 6), i.e. His-Ala-Glu-Gly-Thr-Phe-Thr-Ser-Asp-Val-Ser-Ser-Tyr-Leu-Glu-Gly-Gln-Ala-Ala-Z-Glu-Phe-Ie-Ala-Trp-Leu-Val-Arg-Gly-Arg-Gly,
   wherein Z is selected from the group consisting of Lys, Lys(PG), Lys(y-Glu), and Lys(Pal-γ-Glu);
   comprising a step of coupling
   a) a peptide C-terminal (thio)ester comprising a first peptide fragment with the sequence His-Ala-Glu-Gly-Thr-Phe-Thr-Ser-Asp-Val-Ser-(thio)ester (SEQ ID NO: 37); with
   (b) a peptide nucleophile fragment having an N-terminally unprotected amine comprising a second peptide fragment with the sequence H-Ser-Tyr-Leu-Glu-Gly-Gln-Ala-Ala-Z-Glu-Phe-Ie-Ala-Trp-Leu-Val-Arg-Gly-Arg-Gly-OH (SEQ ID NO: 38),
   wherein the coupling is preferably performed in an aqueous solution, and wherein the coupling is catalyzed by a subtilisin BPN' variant, having at least 80% sequence identity to subtilisin BPN' SEQ ID NO: 2, comprising a deletion of the amino acids at positions 75-83, and a mutation at the amino acid position S221, the mutation being S221C or S221 selenocysteine, preferably S221C; and characterized by having at least one mutation at an amino acid position selected from the group consisting of L96, D99, A223 and S224,
wherein the amino acid positions are defined according to SEQ ID NO: 2,
and wherein such variant or homologue thereof has ligase activity with an increased selectivity.

In a more preferred embodiment, the subtilisin BPN' variant in the method just described is further characterized by having a combination of mutations selected from the group consisting of L96V and D99R; L96I and D99R; L96I and D99K; L96I and A223S; L96I and S224V; L96V, D99R and A223S; L96V, D99R and S224V; L96I, A223S and S224V; L96I, D99R and A223S; L96I, D99R and S224V; L96I, D99K and S224V; L96V, D99R, A223S and S224V; L96I, D99R, A223S and S224V; and L96I, D99K, A223S and S224V.

Even more preferably, the subtilisin BPN' variant in the method just described has one or more combinations of mutations selected from the group consisting of E156K and G166E; E156K and G166D; and M222H and Y217R.

For instance, preferred combinations of mutations are:
E156K, G166E, L96I and D99R;
  E156K, G166E, L96I and A223S;
  E156K, G166E, L96I and S224V;
  E156K, G166E, L96I, A223S and S224V;
  E156K, G166E, L96I, D99R and A223S;
  E156K, G166E, L96I, D99R and S224V;
  E156K, G166E, L96I, D99R, A223S and S224V;
  Y217R, M222H, L96I, E156K and G166D;
  Y217R, M222H, L96I, E156K, G166D and D99R;
  Y217R, M222H, L96I, E156K, G166D and D99K;
  Y217R, M222H, L96I, E156K, G166D and A223S;
  Y217R, M222H, L96I, E156K, G166D and S224V;
  Y217R, M222H, L96I, E156K, G166D, A223S and S224V;
  Y217R, M222H, L96I, E156K, G166D, D99R and S224V;
  Y217R, M222H, L96I, E156K, G166D, D99R, A223S and S224V;
  Y217R, M222H, L96I, E156K, G166D, D99K and S224V; and
  Y217R, M222H, L96I, E156K, G166D, D99K, A223S and S224V.

Accordingly, another preferred embodiment of the invention is a subtilisin BPN' variant, having at least 80% sequence identity to subtilisin BPN' SEQ ID NO: 2, comprising a deletion of the amino acids at positions 75-83, and a mutation at the amino acid position S221, the mutation being S221C or S221 selenocysteine, preferably S221C; and characterized by the mutations and combinations of mutations listed above, and wherein such variant has ligase activity with an increased reaction rate, coupling efficiency and selectivity for enzymatically synthesizing liraglutide.

Surprisingly good results in coupling efficiency and selectivity of the reaction have been obtained for liraglutide with the subtilisin BPN' variants according to the invention as described in Example 9, wherein the mutations are referred to the Ptl-84 (SEQ ID NO: 4) ligase sequence which has mutations relative to wild type subtilisin BPN' (SEQ ID NO: 2). For instance, at position 156, SEQ ID NO: 2 has E, whereas SEQ ID NO: 4 has N. Thus, for example, the subtilisin BPN' variant according to the invention at entry 9 in the table of Example 9, indicated as Ptl-84+N156K+E166E+L96I, has the mutation at positions 156 indicated as N156K, and not as E156K that it would have if it was referred to SEQ ID NO:2.

The invention will now be illustrated by the following examples.

ABBREVIATIONS

SPPS Solid Phase Peptide Synthesis
CTC 2-chloro-trityl chloride
AEEA 2-[2-(2-aminoethoxy)ethoxy]acetyl
Cbz Benzyloxycarbonyl
For Formyl
Fmoc 9-Fluorenylmethoxycarbonyl
Boc Tert-butyloxycarbonyl
Smoc 2,7-disulfo-9-fluorenylmethoxycarbonyl
Ac Acetyl
PhAc Phenacetyl
Trt Trityl (triphenylmethyl)
tBu Tert-butyl
Pbf 2,2,4,6,7-Pentamethyl-dihydrobenzofuran-5-sulfonyl
eq Equivalent
h hour/s
min minute/s
HPLC High Performance Liquid Chromatography
DIPEA N,N-Diisopropylethylamine
TFA Trifluoroacetic acid
TIS Triisopropylsilane
$Ac_2O$ Acetic anhydride
DMF N,N-Dimethylformamide
DMA N,N-Dimethylacetamide
DCM Dichloromethane
THF Tetrahydrofuran
NMP N-Methyl-2-pyrrolidinone
MTBE Methyl-tert-butylether
MeOH Methanol
DCC N,N'-Dicyclohexylcarbodiimide
EDC N-(3-dimethylaminopropyl)-N'-ethylcarbodiimide
HOBt 1-Hydroxybenzotriazole
HOAt 1-Hydroxy-7-azabenzotriazole
TCEP tris(2-carboxyethyl)phosphine
Tricine N-(2-Hydroxy-1,1-bis(hydroxymethyl)ethyl)glycine

EXAMPLES

Production of Enzymes (or Enzyme Variants) (for Use) According to the Invention
Mutagenesis, Cloning and Expression The reference enzyme denoted as Ptl-84 (SEQ ID NO: 4) corresponds to SEQ ID NO: 2 with deletion of the amino acids corresponding to positions 75-83 (Δ75-83, $Ca^{2+}$ binding loop) and including the mutations Q2K, S3C, P5S, S9A, I31L, K43N, M50F, N62A, A73L, E156N, G166E, G169A, S188P, F189W, Q206C, N212G, Y217H, N218D, S221C, M222P, P225N, T254A and Q271E. The gene coding for Ptl-84 with a His-tag was cloned into a pUB-110 based E. coli-B. subtilis shuttle vector (i.e. pBS42 or pBES). Ptl-84 was previously disclosed in WO2019170918 (therein corresponding to SEQ ID NO:3).

The corresponding amino acid sequence is numbered according to the subtilisin BPN' numbering scheme. Amino acids −107 to −1 comprise the signal sequence, the pre sequence and a pro sequence which are cleaved off upon full maturation. Amino acids 1-275 comprise the mature enzyme which exhibits the full catalytic activity. In order to enable a fast and efficient purification after amino acid 275 a C-terminal His-tag is attached. As a consequence of the removal of the calcium binding site, Ptl-84 contains a deletion of 9 amino acids compared to subtilisin BPN' comprising the amino acids corresponding to L75, N76, N77, S78, I79, G80, V81, L82 and G83 in subtilisin BPN'. In order to maintain the subtilisin BPN' numbering for Ptl-84 (and for the enzymes of the invention) the numbering leaps from 74 to 84. In the shuttle vector, the expression of the gene is under the control of aprE promoter. The resulting plasmid pBES-Ptl-84 HIS was propagated in E. coli TOP10 and transformed into B. subtilis GX4935 (trpC2 metB10 lys-3ΔnprEΔaprE). Using pBES-Ptl-84 HIS as the template, mutagenesis was carried out by the Quikchange method (Agilent). Alternatively, other methods for site directed mutagenesis known in the art may be used. Alternatively, DNA was synthesized by GenScript, USA and incorporated into the respective shuttle vector.

Production and Purification of Synthetic Subtilisin BPN' Variants which Carry a His-Tag:

A single microbial colony of *B. subtilis* containing a plasmid with the subtilisin variant gene of interest was inoculated in 5 mL LB with kanamycin (10 µg/mL) at 37° C. in a shaking incubator. To the 30 mL Terrific Broth supplemented with antibiotic (kanamycin 10 µg/mL) and amino acids (100 mg/L Trp, 100 mg/L Met and 100 mg/L Lys) 0.6 mL of the overnight culture was added. The cells were grown 48 h at 37° C. in a shaking incubator (200 rpm). The cells were harvested by centrifugation (30 min, 4,000 rpm, 4° C.). The medium (30 mL) was decanted and concentrated on Amicon-centrifugal unit (15 ml, 10 kDa MW cut-off) in two centrifugation steps (15 min, 4000 rpm, 4° C.). The concentrated medium (0.5 ml) was then exchanged for buffer A (25 mM Tricine, pH 7.5, 0.5 M NaCl) in three washing/concentrating steps (14 ml buffer A, 10 min, 4,000 rpm, 4° C.). For His-tag purification Talon resin (2.5 ml, Clonetech) was added to a plastic column cartridge. The resin was washed with 20 mL demineralized water and equilibrated with 20 mL of buffer A. The crude enzyme was loaded on the column and incubated overnight at orbital shaker at 4° C. After incubation the resin was washed with 100 mL buffer A. The enzyme was eluted with 15 mL buffer B (25 mM Tricine, pH 7.5, 0.5 M NaCl, 0.5 M imidazole). The elute was further incubated 30 min with 6 mM TCEP (tris(2-carboxyethyl)phosphine) and concentrated on a Amicon-centrifugal unit (15 ml, 10 kDa MW cut-off) by centrifugation (30 min, 4000 rpm, 4° C.) and the buffer was exchanged to 25 mM Tricine, pH 7.5 in three washing/concentrating steps (15 ml buffer, 10 min, 4,000 rpm, 4° C.).

The purity was determined by SDS-PAGE and densitometric analysis (BioRad GS-900). Enzyme concentration was determined by measuring absorbance at 280 nm using Nanodrop (Thermo Scientific) with 1 Abs=1 mg/ml. The obtained aqueous solution (25 mM Tricine, pH 7.5) containing about 0.1-2 mg/ml of the obtained enzyme. The solution with corrected enzyme concentration (mg/ml*purity) was used as such for the coupling and cyclization reaction.

For a detailed description regarding the production and purification of synthetic subtilisin BPN' variants reference is made to WO 2016/056913 and WO 2018/212658.

Enzymatic Fragment Coupling Examples

Materials and Methods

Unless stated otherwise, chemicals were obtained from commercial sources and used without further purification. Analytical HPLC was performed on an HP1090 Liquid Chromatograph, using a reversed-phase column (Phenomenex, C18, 5 µm particle size, 150×4.6 mm) at 40° C. UV detection was performed at 220 nm using a UV-VIS 204 Linear spectrometer. The gradient program was: 0-25 min linear gradient ramp from 5% to 98% eluent B and from 25.1-30 min 5% eluent B (eluent A: 0.5 mL/L methane sulfonic acid (MSA) in $H_2O$, eluent B 0.5 mL/L MSA in acetonitrile). The flow was 1 mL/min from 0-25.1 min and 2 mL/min from 25.2-29.8 min, then back to 1 mL/min until stop at 30 min. Injection volumes were 20 µL. Preparative HPLC was performed on a Varian PrepStar system using a stationary-phase column (Pursuit XRs, C18, 10 µm particle size, 500×41.4 mm). LC-MS was performed on an Agilent 1200 series Liquid Chromatograph, using a reversed-phase column (Phenomenex, C18, 5 µm particle size, 150×4.6 mm) at 40° C. UV detection and gradient program were as described for analytical HPLC. The molecular weights were determined using an Agilent 6130 quadrupole LC/MS system.

Protocol 1: Peptide-OCam-Leu-OH Esters Preparation 1 g of Fmoc-Leu-Wang resin (with a loading of 0.72 mmol/g) was washed with DCM (2×2 min, 10 mL) and DMF (2×2 min, 10 mL) and Fmoc-deprotected using piperidine/DMF (¼, v/v, 2×8 min, 10 mL). After washing with DMF (2×2 min, 10 mL), DCM (2×2 min, 10 mL) and DMF (2×2 min, 10 mL), iodoacetic acid (4 eq) was coupled to the resin using DCC (4 eq) and HOAt (4 eq) in DCM (45 min, 10 mL). After washing with DMF (2×2 min, 10 mL), DCM (2×2 min, 10 mL) and THF (2×2 min, 10 mL), the resin was loaded with a Fmoc-protected amino acid using 4 eq. Fmoc-Xxx-OH and 10 eq. DIPEA in DMF/THF (1/1, v/v, 10 mL) at 50° C. for 20 h. Here and in other parts of this disclosure 'Xxx' stands for one amino acid (variable depending on the target peptide, as indicated in the examples below).

After washing with DMF (2×2 min, 10 mL), DCM (2×2 min, 10 mL) and DMF (2×2 min, 10 mL), standard SPPS protocols were followed to elongate the peptide. Cleavage from the resin and side-chain deprotection was performed using a mixture of TFA, TIS and water (95/2.5/2.5, v/v/v, 15 mL) for 120 min. The crude peptide was precipitated using MTBE/n-heptanes (1/1, v/v, 50 mL). The precipitated peptide was collected by centrifugation and washed twice with MTBE/n-heptanes (1/1, v/v, 50 mL) followed by lyophilization from acetonitrile/water (1/1, v/v, 50 mL).

Protocol 2: Peptide-OCam-Phe-Lys-$NH_2$ Esters Preparation 1 g of Rink resin (4-((2,4-dimethoxyphenyl)(Fmoc-amino)methyl)phenoxyalkyl linker, with a loading of 0.64 mmol/g) was washed with DCM (2×2 min, 10 mL) and DMF (2×2 min, 10 mL), and then Fmoc-deprotected using piperidine/DMF (¼, v/v, 2×8 min, 10 mL). Standard SPPS protocols were followed to couple Fmoc-Lys(Boc)-OH followed by Fmoc-Phe-OH. After Fmoc-deprotection using piperidine/DMF (¼, v/v, 2×8 min, 10 mL), washing with DMF (2×2 min, 10 mL), DCM (2×2 min, 10 mL) and DMF (2×2 min, 10 mL), iodoacetic acid (4 eq) was coupled to the resin using DCC (4 eq) and HOAt (4 eq) in DCM (45 min, 10 mL). After washing with DMF (2×2 min, 10 mL), DCM (2×2 min, 10 mL) and THF (2×2 min, 10 mL), the resin was loaded with a Fmoc-protected amino acid using Fmoc-Xxx-OH (4 eq) and DIPEA (10 eq) in DMF/THF (1/1, v/v, 10 mL) at 50° C. for 20 h.

After washing with DMF (2×2 min, 10 mL), DCM (2×2 min, 10 mL) and DMF (2×2 min, 10 mL), standard SPPS protocols were followed to elongate the peptide. Cleavage from the resin and side-chain deprotection was performed using a mixture of TFA, TIS and water (95/2.5/2.5, v/v/v, 15 mL) for 120 min. The crude peptide was precipitated using MTBE/n-heptanes (1/1, v/v, 50 mL). The precipitated peptide was collected by centrifugation, washed twice with MTBE/n-heptanes (1/1, v/v, 50 mL) and dried in vacuo to provide the title ester (also indicated as peptide-OCam-FK—$NH_2$ ester). Prior to enzymatic ligation, the crude peptides were purified by preparative HPLC followed by lyophilization of the pure fractions.

Analogously, a peptide-OCam-FR—NH₂ ester is prepared.

Protocol 3a: C-Terminal Amide Peptide Nucleophiles Preparation 1 g of Rink resin (4-((2,4-dimethoxyphenyl)(Fmoc-amino)methyl)phenoxyalkyl linker, with a loading of 0.64 mmol/g) was washed with DCM (2×2 min, 10 mL) and DMF (2×2 min, 10 mL) and Fmoc-deprotected using piperidine/DMF (¼, v/v, 2×8 min, 10 mL). Standard SPPS protocols were followed to elongate the peptide. Cleavage from the resin and side-chain deprotection was performed using a mixture of TFA/TIS/water (95/2.5/2.5, v/v/v, 15 mL) for 120 min. The crude peptide was precipitated using MTBE/n-heptanes (1/1, v/v, 50 mL). The precipitated peptide was collected by centrifugation, washed twice with MTBE/n-heptanes (1/1, v/v, 50 mL) and dried in vacuo. Prior to enzymatic ligation, the crude peptides were purified by preparative HPLC followed by lyophilization of the pure fractions.

Protocol 3b: C-Terminal Carboxylic Acid Peptide Nucleophiles Preparation 1 gram of preloaded Fmoc-Xxx-Wang resin (with a loading of 0.30 mmol/gram) was washed with DCM (2×2 min, 10 mL) and DMF (2×2 min, 10 mL) and Fmoc-deprotected using piperidine/DMF (⅕, v/v, 2×8 min, 10 mL). Standard SPPS protocols were followed to elongate the peptide. Cleavage from the resin and side-chain deprotection was performed using a mixture of TFA/TIS/water (95/2.5/2.5, v/v/v, 15 mL) for 120 min. The crude peptide was precipitated using MTBE/n-heptanes (1/1, v/v, 50 mL). The precipitated peptide was collected by centrifugation, washed twice with MTBE/n-heptanes (1/1, v/v, 50 mL) and dried in vacuo. Prior to enzymatic ligation, the crude products were purified by preparative HPLC followed by lyophilization of the pure fractions.

Protocol 4: N-Acetyl-Protected Peptide Activated Esters Preparation

After SPPS of the desired sequence according to one of the protocols 1 or 2, the resin bound peptide was Fmoc-deprotected using piperidine/DMF (¼, v/v, 2×8 min, 10 mL). The resin was washed with DMF (2×2 min, 10 mL), DCM (2×2 min, 10 mL) and DMF (2×2 min, 10 mL) and the peptide N-terminal amine function was acetylated using a mixture of Ac₂O (10 vol %), DIPEA (5 vol %), HOBt (0.2 wt %) in DMF (2×10 min, 10 mL). The resin was washed with DMF (3×2 min, 10 mL) and DCM (3×2 min, 10 mL). Cleavage from the resin and side-chain deprotection was performed using a mixture of TFA/TIS/water (95/2.5/2.5, v/v/v, 15 mL) for 120 min. The crude peptide was precipitated using MTBE/n-heptanes (1/1, v/v, 50 mL). The precipitated peptide was collected by centrifugation, washed twice with MTBE/n-heptanes (1/1, v/v, 50 mL) and dried in vacuo. Prior to enzymatic ligation, the crude peptides were purified by preparative HPLC followed by lyophilization of the pure fractions.

Analogously, N-Phenacetyl-protected peptide activated esters are also prepared, by using PhAc₂O instead of Ac₂O.

Protocol 5: Screening of New Enzyme Variants in the Synthesis of Liraglutide (SEQ ID NO: 6) from Two Fragments A stock solution was prepared of 5 mg/mL H-Lira(1-11)-OCam-FK—NH₂ (i.e. H-$^1$His-$^2$Ala-$^3$Glu-$^4$Gly-$^5$Thr-$^6$Phe-$^7$Thr-$^8$Ser-$^9$Asp-$^{10}$Val-$^{11}$Ser-OCam-Phe-Lys-NH₂·3TFA (SEQ ID NO: 39), prepared according to Protocol 2) and 5 mg/mL H-Lira(12-31)-OH(H-$^{12}$Ser-$^{13}$Tyr-$^{14}$Leu-$^{15}$Glu-$^{16}$Gly-$^{17}$Gln-$^{18}$Ala-$^{19}$Ala-$^{20}$Lys(Pal-gamma-Glu)-$^{21}$Glu-$^{22}$Phe-$^{23}$Ile-$^{24}$Ala-$^{25}$Trp-$^{26}$Leu-$^{27}$Val-$^{28}$Arg-$^{29}$Gly-$^{30}$Arg-$^{31}$Gly-OH·3TFA (SEQ ID NO: 40), prepared according to Protocol 3b, see also WO2019170918), dissolved in a buffer containing 50 mM Tricine, 220 mM potassium trifluoroacetate, 2 mg/mL TCEP and the pH was set to 7.9 using 1N aqueous KOH. This stock solution could be aliquoted and stored at −20° C. for further use. To a glass vial, 50 µL of the above peptide stock solution was added and the coupling reaction was started by mixing with 25 µL of enzyme variant solution (0.2 mg/mL in a buffer containing 25 mM Tricine at pH 7.5). At different time points (usually 0, 15, 30, 60 and 120 min), 10 µL of the reaction mixture was quenched in 250 µL methanesulfonic acid in demineralized water (5 mL/L) to stop any enzyme activity. The quenched samples were analyzed using HPLC/MS. The HPLC peaks referring to the coupling product liraglutide (H-Lira(1-31)-OH) were integrated and are expressed as HPLC area % in the tables of each Example.

Note: after 60 min the reaction is normally not completed yet, thus this time point is used to highlight the differences between the variants (a slower enzyme could still give the same product yield at a later time point). 60 min time point was used in Examples 1, 2, 3, 5, 6, 8 relating to liraglutide, and in Examples 4, 10, 11, 12 and 13.

Protocol 6: Screening of New Enzyme Variants in the Synthesis of a 8-Mer Model Peptide (SEQ ID NO: 14)

A stock solution was prepared of 9.4 mg/mL ester (Ac-Asp-Phe-Ser-Lys-Leu-OCam-Leu-OH·1TFA (SEQ ID NO: 41), prepared according to Protocol 1 and 4) and 8.8 mg/mL amine (H-Ala-Leu-Arg-NH₂·2TFA, prepared according to Protocol 3a), dissolved in a buffer containing 50 mM Tricine, 220 mM potassium trifluoroacetate, 2 mg/mL TCEP and the pH was set to 7.9 using 1N aqueous KOH. This stock solution could be aliquoted and stored at −20° C. for further use. To a glass vial, 25 µL of the above peptide stock solution, 65 µL of a buffer containing 50 mM Tricine, 220 mM potassium trifluoroacetate was added and the reaction was started by mixing with 12.5 µL of enzyme variant solution (0.2 mg/mL in a buffer containing 25 mM Tricine at pH 7.5, thus amounting to 2.5 µg enzyme). At different time points (usually 0, 15, 30, 60 and 120 min), 10 µL of the reaction mixture was quenched in 190 µL methanesulfonic acid in demineralized water (5 mL/L) to stop any enzyme activity. The quenched samples were analyzed using HPLC/MS. The HPLC peaks referring to the coupling product (Ac-Asp-Phe-Ser-Lys-Leu-Ala-Leu-Arg-NH₂, SEQ ID NO: 14) were integrated for each enzyme variant and are expressed as HPLC area % in the tables of the respective Example.

Protocol 7: Screening the Selectivity of New Enzyme Variants in the Synthesis of Liraglutide (SEQ ID NO: 6) from Two Fragments A stock solution was prepared of 7.87 mM H-Lira(1-11)-OCam-FK—NH₂ (H-$^1$His-$^2$Ala-$^3$Glu-$^4$Gly-$^5$Thr-$^6$Phe-$^7$Thr-$^8$Ser-$^9$Asp-$^{10}$Val-$^{11}$Ser-OCam-Phe-Lys-NH₂(SEQ ID NO: 39), prepared according to Protocol 2) and 4.49 mM H-Lira(12-31)—OH(H-$^{12}$Ser-$^{13}$Tyr-$^{14}$Leu-$^{15}$Glu-$^{16}$Gly-$^{17}$Gln-$^{18}$Ala-$^{19}$Ala-$^{20}$Lys(Pal-gamma-Glu)-$^{21}$Glu-$^{22}$Phe-$^{23}$Ile-$^{24}$Ala-$^{25}$Trp-$^{26}$Leu-$^{27}$Val-$^{28}$Arg-$^{29}$Gly-$^{30}$Arg-$^{31}$Gly-OH (SEQ ID NO: 40), prepared according to Protocol 3b, see also WO2019170918), dissolved in a buffer containing 50 mM Tricine, 220 mM potassium trifluoroacetate acid, 0.25 mg/mL TCEP and the pH was set to 7.9 using 3N aqueous KOH. This stock solution could be aliquoted and stored at −20° C. for further use. To a glass vial, 85 µL of the above peptide stock solution was added and the reaction was started by mixing with 15 µL of enzyme variant solution (0.2 mg/mL in a buffer containing 25 mM Tricine; 125 mM NaCl at pH 7.5). At different time points (usually 0, 15, 30, 60, 120 and 360 min), 10 μL of the reaction mixture was quenched in 250 μL methanesulfonic acid in demineralized water (5 mL/L) to stop any enzyme activity. The quenched samples were analyzed using HPLC/MS. The conversion to product was calculated by integrating the liraglutide (H-Lira(1-31)-OH) product and the unreacted peptide amine (H-Lira(12-31)-OH) peaks and are expressed as HPLC area % in the tables of each Example. The selectivity value was calculated by the amount (area %) of liraglutide (H-Lira(1-31)-OH) product divided by the amount (area %) of the undesired by-product H-Lira(1-11-1-31)—OH. The conversion to product and selectivity value were calculated after full conversion of the acyl donor ester (between 30-360 min).

Coupling Examples

Note: the reference enzyme denoted as Ptl-84 (SEQ ID NO: 4), as mentioned above, corresponds to SEQ ID NO: 2 (wild type subtilisin BPN') with deletion of the amino acids corresponding to positions 75-83 and including the additional mutations Q2K, S3C, P5S, S9A, I31L, K43N, M50F, N62A, A73L, E156N, G166E, G169A, S188P, F189W, Q206C, N212G, Y217H, N218D, S221C, M222P, P225N, T254A and Q271E, plus a 6-His tag.

Another reference enzyme is denoted as Ptl-79 (SEQ ID NO: 5) and corresponds to SEQ ID NO: 2 (wild type subtilisin BPN') with deletion of the amino acids corresponding to positions 75-83 and including the additional mutations Q2K, S3C, P5S, S9A, I31L, K43N, M50F, A73L, I107V, E156S, G166S, G169A, S188P, F189W, Q206C, N212G, Y217H, N218S, S221C, M222P, P225N, T254A, and Q271E, plus a 6-His tag.

All the enzymes used in the Examples 1-13 have all the mutations of the mentioned reference enzyme (either Ptl-84 or Ptl-79), plus the additional mutations as mentioned in each Example. Ptl-84, Ptl-79, any other reference enzyme and the enzymes of the present invention were produced using the technology described above.

Example 1: Synthesis of Liraglutide (SEQ ID NO: 6) from Two Fragments Using Ptl-84+L96X Variants To determine the effect of a L96 mutation on the synthesis of Liraglutide, a screening was performed following Protocol 5. The amount of the coupling product liraglutide (H-Lira(1-31)—OH) after 60 min of reaction is listed in the table below for representative enzyme variants. The reference enzyme Ptl-84, containing no mutation at position L96, is indicated in bold.

| Number | Enzyme variant | H-Lira(1-31)-OH area % |
|---|---|---|
| 1 | Ptl-84 + L96I | 51.50 |
| 2 | Ptl-84 + L96V | 46.11 |
| 3 | Ptl-84 + L96M | 43.84 |
| 4 | Ptl-84 + L96T | 41.82 |
| 5 | Ptl-84 + L96A | 41.18 |
| 6 | Ptl-84 + L96C | 40.24 |
| 7 | Ptl-84 + L96S | 39.81 |
| 8 | Ptl-84 + L96Q | 36.51 |
| 9 | Ptl-84 + L96H | 35.28 |
| 10 | Ptl-84 | 33.93 |

Clearly, the L96 position had a significant effect on the reaction rate and the coupling efficiency. Nine variants (Ptl-84+L96I N/M/T/A/C/S/Q/H) scored remarkably better than the wild-type enzyme. These variants can be used to produce liraglutide in a higher yield while less enzyme is required for the same conversion rate relative to the wild type enzyme.

Example 2: Synthesis of Liraglutide (SEQ ID NO: 6) from Two Fragments Using Ptl-84+D99X Variants To determine the effect of a D99 mutation on the synthesis of liraglutide, a screening was performed following Protocol 5. The amount of the coupling product liraglutide (H-Lira (1-31)—OH) after 60 min of reaction is listed in the table below for representative enzyme variants.

| Number | Enzyme variant | H-Lira(1-31)-OH area % |
|---|---|---|
| 1 | Ptl-84 + D99R | 69.96 |
| 2 | Ptl-84 + D99K | 68.04 |
| 3 | Ptl-84 + D99G | 67.19 |
| 4 | Ptl-84 + D99F | 65.82 |
| 5 | Ptl-84 + D99T | 65.14 |
| 6 | Ptl-84 + D99S | 64.83 |
| 7 | Ptl-84 + D99Q | 64.11 |
| 8 | Ptl-84 + D99N | 64.09 |
| 9 | Ptl-84 + D99Y | 63.92 |
| 10 | Ptl-84 + D99A | 63.49 |
| 11 | Ptl-84 + D99M | 63.23 |
| 12 | Ptl-84 + D99I | 63.22 |
| 13 | Ptl-84 + D99V | 62.81 |
| 14 | Ptl-84 + D99H | 62.75 |
| 15 | Ptl-84 + D99L | 62.40 |
| 16 | Ptl-84 + D99E | 62.31 |
| 17 | Ptl-84 + D99W | 61.62 |
| 18 | Ptl-84 | 55.00 |

Clearly, the D99 position had a significant effect on the reaction rate and the coupling efficiency. Seventeen variants (Ptl-84+D99R/K/G/F/T/S/Q/N/Y/A/M/IN/H/L/E/W) scored remarkably better than the wild-type. These variants can be used to produce liraglutide in a higher yield while less enzyme is required for the same conversion rate relative to the wild type.

Example 3: Synthesis of Liraglutide (SEQ ID NO: 6) from Two Fragments Using Ptl-84+A223X Variants To determine the effect of a A223 mutation on the synthesis of liraglutide, a screening was performed following Protocol 5. The amount of the coupling product liraglutide (H-Lira(1-31)—OH) after 60 min of reaction is listed in the table below for representative enzyme variants.

| Number | Enzyme variant | H-Lira(1-31)-OH area % |
|---|---|---|
| 1 | Ptl-84 + A223S | 51.54 |
| 2 | Ptl-84 + A223G | 50.14 |
| 3 | Ptl-84 | 45.13 |

Clearly the A223 position had an effect on reaction rate and coupling efficiency. Surprisingly, the A223S and A223G mutations had a very positive effect on reaction rate and efficiency. These variants can be used to produce liraglutide in a higher yield while less enzyme is required for the same conversion rate relative to the wild type enzyme.

Example 4: Synthesis of the 8-Mer Model Peptide (SEQ ID NO: 14) Using Ptl-84+S224X Variants To determine the effect of a S224 mutation on the synthesis of an 8-mer model peptide, a screening was performed following Protocol 6. The amount of the coupling product Ac-Asp-Phe-Ser-Lys-Leu-Ala-Leu-Arg-NH$_2$ (SEQ ID NO: 14) after 60 min of reaction is listed in the table below for representative enzyme variants.

| Number | Enzyme variant | Ac-Asp-Phe-Ser-Lys-Leu-Ala-Leu-Arg-NH$_2$ |
|---|---|---|
| 1 | Ptl-84 + S224M | 95.64% |
| 2 | Ptl-84 + S224Q | 89.20% |
| 3 | Ptl-84 + S224E | 76.13% |
| 4 | Ptl-84 + S224H | 72.10% |
| 5 | Ptl-84 + S224L | 70.16% |
| 6 | Ptl-84 + S224V | 68.41% |
| 7 | Ptl-84 + S224I | 66.90% |
| 8 | Ptl-84 | 61.08% |

Clearly the S224 position had a significant effect on the reaction rate and the coupling efficiency. Seven variants (Ptl-84+S224I N/L/H/E/Q/M) scored remarkably better than the wild-type enzyme. These variants can be used to produce peptides in a higher yield while less enzyme is required for the same conversion rate relative to the wild type enzyme.

Example 5: Synthesis of Liraglutide (SEQ ID NO: 6) from Two Fragments with the Addition of a L96 Mutation to Several Different Enzyme Variants To determine the effect of an L96 mutation on the synthesis of liraglutide, a screening was performed following Protocol 5. The amount of the coupling product liraglutide (H-Lira(1-31)—OH) after 60 min of reaction is listed in the table below for representative enzyme variants. Nine reference enzymes are compared to corresponding mutants bearing a mutation at L96 position. For each series, the reference enzyme containing no mutation at position L96 is in bold. Each reference enzyme (numbered 1, 4, 7, 10, 13, 16, 18, 21, 23) has Ptl-84 mutations plus the additional indicated mutations at positions 156, 166, 33, 62, 217, 222.

| Number | Enzyme variant | H-Lira(1-31)-OH Area % |
|---|---|---|
| 1 | Ptl-84 + N156K + E166D | 25.99 |
| 2 | Ptl-84 + N156K + E166D + L96I | 31.08 |
| 3 | Ptl-84 + N156K + E166D + L96V | 32.10 |
| 4 | Ptl-84 + N156K | 3.81 |
| 5 | Ptl-84 + N156K + L96I | 44.46 |
| 6 | Ptl-84 + N156K + L96V | 42.07 |
| 7 | Ptl-84 + N156R | 7.35 |
| 8 | Ptl-84 + N156R + L96I | 40.18 |
| 9 | Ptl-84 + N156R + L96V | 28.12 |
| 10 | Ptl-84 + S33T + A62R | 10.71 |
| 11 | Ptl-84 + S33T + A62R + L96I | 27.19 |
| 12 | Ptl-84 + S33T + A62R + L96V | 31.69 |
| 13 | Ptl-84 + S33T + A62K | 17.95 |
| 15 | Ptl-84 + S33T + A62K + L96V | 34.64 |
| 16 | Ptl-84 + N156R + S33T + A62K | 26.76 |
| 17 | Ptl-84 + N156R + S33T + A62K + L96I | 38.67 |
| 18 | Ptl-84 + H217L + P222G | 8.07 |
| 19 | Ptl-84 + H217L + P222G + L96I | 58.86 |
| 20 | Ptl-84 + H217L + P222G + L96V | 57.43 |
| 21 | Ptl-84 + H217L + P222G + N156R | 48.54 |
| 22 | Ptl-84 + H217L + P222G + N156R + L96I | 67.22 |
| 23 | Ptl-84 + H217L + P222G + N156K + E166D | 10.12 |
| 24 | Ptl-84 + H217L + P222G + N156K + E166D + L96I | 49.21 |

Clearly, the L96 mutation had a positive effect on the reaction rate and the coupling efficiency. This mutation remained beneficial when combined with other mutations at previously described mutated positions (WO 2018/212658), such as S33, N62, E156, G166, Y217 and/or M222.

Example 6: Synthesis of Liraglutide (SEQ ID NO: 6) from Two Fragments with D99 Mutated Variants To determine the effect of a D99 mutation on the synthesis of liraglutide, a screening was performed following Protocol 5, but only 15 µL of enzyme variant solution was used (instead of 25 µL). The amount of the coupling product liraglutide (H-Lira(1-31)—OH) after 60 min of reaction is listed in the table below for representative enzyme variants. Two reference enzymes are compared to the corresponding mutants bearing a mutation at D99 position. For each series, the reference enzyme containing no mutation at position D99 is in bold. Reference enzyme (3) has Ptl-84 mutations plus the additional indicated mutation.

| Number | Enzyme variant | H-Lira(1-31)-OH Area % |
|---|---|---|
| 1 | Ptl-84 | 30.96 |
| 2 | Ptl-84 + D99R | 39.46 |
| 3 | Ptl-84 + N156K | 41.20 |
| 4 | Ptl-84 + N156K + D99R | 46.04 |
| 5 | Ptl-84 + N156K + D99K | 45.68 |
| 6 | Ptl-84 + N156K + D99G | 48.69 |

Clearly, the D99 mutation had a positive effect on the reaction rate and the coupling efficiency.

Example 7: Synthesis of 8-Mer Model Peptide (SEQ ID NO: 14) Using Combination Variants To determine the effect of the combination of the mutations of the invention on the synthesis of an 8-mer model peptide, a screening was performed following Protocol 6. Because the enzymes are improved variants, less enzyme was used (5 µL of enzyme variant solution, amounting to 1 µg enzyme) in order to better distinguish the effects of the mutations. In addition, both the HPLC peaks of the target peptide Ac-Asp-Phe-Ser-Lys-Leu-Ala-Leu-Arg-NH$_2$ (SEQ ID NO: 14) and of the hydrolyzed peptide ester Ac-Asp-Phe-Ser-Lys-Leu-OH (SEQ ID NO: 41) were integrated after 15 min and the S/H ratio was calculated by dividing the area % of the target peptide by the area % of the hydrolyzed peptide ester (last column). The reference enzymes are in bold.

| Number | Enzyme variant | Ac-Asp-Phe-Ser-Lys-Leu-Ala-Leu-Arg-NH2; Area % | S/H ratio |
|---|---|---|---|
| 1 | Ptl-79 | 34.64 | 9.63 |
| 2 | Ptl-79 + L96V | 65.16 | 17.09 |
| 3 | Ptl-79 + D99R | 36.81 | 9.82 |
| 4 | Ptl-79 + L96V + D99R | 71.25 | 19.90 |
| 5 | Ptl-79 + L96V + D99R + S224V | 80.04 | 32.84 |
| 6 | Ptl-79 + L96V + D99R + A223S + S224V | 83.41 | 31.58 |
| 7 | Ptl-79 + G100D | 48.29 | 14.56 |
| 8 | Ptl-79 + L96V + D99R + G100D | 60.24 | 18.98 |

Clearly, each of the single mutations had a positive effect on the reaction rate and also resulted in the increase of the S/H ratio. In particular, the combination of L96V+D99R (entry 4) showed a synergistic effect relative to single L96V (entry 2) and D99R (entry 3) variants both in terms of reaction rate and S/H ratio.

Example 8: Synthesis of Liraglutide (SEQ ID NO: 6) from Two Fragments with Combined Mutated Variants To determine the effect of combination of mutations on the synthesis of liraglutide, a screening was performed following Protocol 5, but only 15 µL of enzyme variant solution was used (instead of 25 µL). The amount of the coupling product liraglutide (H-Lira(1-31)—OH) after 60 min of reaction is listed in the table below for representative enzyme variants. Reference enzyme Ptl-84 is in bold.

| Number | Enzyme variant | H-Lira(1-31)-OH Area % |
|---|---|---|
| 1 | Ptl-84 | 28.48 |
| 2 | Ptl-84 + D99R | 39.46 |
| 3 | Ptl-84 + L96V | 51.48 |
| 4 | Ptl-84 + L96V + D99R | 59.38 |

Clearly, the mutations at positions L96 and D99 had a positive effect on reaction rate and coupling efficiency, both as single mutations and in combination.

Example 9: Synthesis of Liraglutide (SEQ ID NO: 6) from Two Fragments to Determine the Effect on Selectivity of Combination Variants To determine the effect of combination of mutations on the coupling efficiency and selectivity, a screening was performed following Protocol 7. For the assessment of the conversion to the ligation product, the amounts of the coupling product liraglutide (H-Lira(1-31)—OH, SEQ ID NO: 6), unreacted peptide amine (H-Lira(12-31)—OH, SEQ ID NO: 40) and by-product H-Lira(1-11-1-31)—OH (SEQ ID NO: 42, which is formed by reaction of the acyl donor H-Lira(1-11)—OCam-FK—NH$_2$ (SEQ ID NO: 39) with H-Lira(1-31)—OH (SEQ ID NO: 6)) were measured after full conversion of the acyl donor ester fragment (SEQ ID NO: 39) (within 30-360 min). The amount of liraglutide is listed in the table below for each tested enzyme variant, together with the respective selectivity value.

| Number | Enzyme variant | H-Lira(1-31)-OH Area % | H-Lira(1-31)-OH Area %/ H-Lira(1-11-1-31)-OH) Area % |
|---|---|---|---|
| 1 | Ptl-84 | 66.96 | 9.05 |
| 2 | Ptl-84 + D99R | 80.11 | 11.52 |
| 3 | Ptl-84 + L96V | 79.81 | 10.27 |
| 4 | Ptl-84 + L96V + D99R | 88.01 | 11.97 |
| 5 | Ptl-84 + S224V | 73.13 | 16.33 |
| 6 | Ptl-84 + L96V + D99R + A223S | 86.72 | 14.30 |
| 7 | Ptl-84 + L96V + D99R + S224V | 89.84 | 13.32 |
| 8 | Ptl-84 + L96V + D99R + A223S + S224V | 85.75 | 15.67 |
| 9 | Ptl-84 + N156K + E166E + L96I | 84.51 | 13.67 |
| 10 | Ptl-84 + N156K + E166E + L96I + D99R | 89.52 | 18.63 |
| 11 | Ptl-84 + N156K + E166E + L96I + A223S | 84.52 | 15.98 |
| 12 | Ptl-84 + N156K + E166E + L96I + S224V | 90.27 | 19.06 |
| 13 | Ptl-84 + N156K + E166E + L96I + A223S + S224V | 83.06 | 28.57 |
| 14 | Ptl-84 + N156K + E166E + L96I + D99R + A223S | 92.19 | 13.31 |
| 15 | Ptl-84 + N156K + E166E + L96I + D99R + S224V | 94.13 | 21.87 |

| Number | Enzyme variant | H-Lira(1-31)-OH Area % | H-Lira(1-31)-OH Area %/ H-Lira(1-11-1-31)-OH) Area % |
|---|---|---|---|
| 16 | Ptl-84 + N156K + E166E + L96I + D99R + A223S + S224V | 88.08 | 30.50 |
| 17 | Ptl-84 + H217R + P222H + L96I + N156K + E166D | 83.30 | 32.65 |
| 19 | Ptl-84 + H217R + P222H + L96I + N156K + E166D + D99R | 87.61 | 39.94 |
| 20 | Ptl-84 + H217R + P222H + L96I + N156K + E166D + D99K | 92.79 | 25.33 |
| 21 | Ptl-84 + H217R + P222H + L96I + N156K + E166D + A223S | 75.66 | 51.16 |
| 22 | Ptl-84 + H217R + P222H + L96I + N156K + E166D + S224V | 78.58 | 159.06 |
| 23 | Ptl-84 + H217R + P222H + L96I + N156K + E166D + A223S + S224V | 95.31 | 67.15 |
| 24 | Ptl-84 + H217R + P222H + L96I + N156K + E166D + D99R + S224V | 97.67 | 108.23 |
| 25 | Ptl-84 + H217R + P222H + L96I + N156K + E166D + D99R + A223S + S224V | 89.17 | 169.01 |
| 26 | Ptl-84 + H217R + P222H + L96I + N156K + E166D + D99K + S224V | 77.23 | 172.61 |
| 27 | Ptl-84 + H217R + P222H + L96I + N156K + E166D + D99K + A223S + S224V | 85.58 | 170.03 |

Clearly the invention mutations improved both the reaction rate and coupling efficiency, and the selectivity of the enzyme as compared to the reference Ptl-84. The single mutations at positions 99, 96 and 224 (entries 2, 3 and 5) improved the selectivity of the Ptl-84 enzyme. The mutations at positions 96 and 99 can be combined with those at 223 and 224 showing improvement in reaction rate and coupling efficiency while keeping very high selectivity.

Example 10: Synthesis of Teriparatide (SEQ ID NO: 11) from Two Fragments Using Different Enzyme Variants A stock solution was prepared of 1.3 mg/ml PhAc-Teri (1-11)-OCam-L-OH(PhAc-$^1$Ser-$^2$Val-$^3$Ser-$^4$Glu-$^5$Ile-$^6$Gln-$^7$Leu-$^8$Met-$^9$His-$^{10}$Asn-$^{11}$Leu-OCam-Leu-OH·1TFA (SEQ ID NO: 43), prepared according to Protocol 1 and Protocol 4) and 4.98 mg/ml H-Teri(12-34)—OH(H-$^{12}$Gly-$^{13}$Lys-$^{14}$His-$^{15}$Leu-$^{16}$Asn-$^{17}$Ser-$^{18}$Met-$^{19}$Glu-$^{20}$Arg-$^{21}$Val-$^{22}$Glu-$^{23}$Trp-$^{24}$Leu-$^{25}$Arg-$^{26}$Lys-$^{27}$Lys-$^{28}$Leu-$^{29}$Gln-$^{30}$Asp-$^{31}$Val-$^{32}$His-$^{33}$Asn-$^{34}$Phe-OH·6TFA (SEQ ID NO: 30), prepared according to Protocol 3b), dissolved in a buffer containing 200 mM Tricine, 2 mg/mL TCEP and the pH was set to 7.9 using 3N aqueous KOH. This stock solution could be aliquoted and stored at −20° C. for further use. To a glass vial, 80 μL of the above peptide stock solution was added and the reaction was started by mixing with 20 μL of enzyme variant solution (0.1 mg/mL in a buffer containing 25 mM Tricine; 125 mM NaCl at pH 7.5). At different time points (usually 0, 15, 30, 60 and 120 min), 10 μL of the reaction mixture was quenched in 250 μL methanesulfonic acid in demineralized water (5 mL/L) to stop any enzyme activity. The quenched samples were analyzed using HPLC/MS. The HPLC peaks referring to the coupling product teriparatide (PhAc-Teri(1-34)—OH) (SEQ ID NO: 11) were integrated and are expressed as HPLC area % in the table below (60 min sample).

| Number | Enzyme variant | PhAc-Teriparatide(1-34)-OH Area % |
|---|---|---|
| 1 | Ptl-79 | 30.99 |
| 2 | Ptl-79 + L96V | 31.00 |
| 3 | Ptl-79 + D99R | 29.67 |
| 4 | Ptl-79 + L96V + D99R | 34.81 |
| 5 | Ptl-79 + G100D | 35.18 |

Even if the single mutations at L96 and D99 positions showed no effect on the reaction rate and the coupling efficiency alone as compared to Ptl-79 reference enzyme, their combination resulted in a synergistic effect.

Example 11: Synthesis of Semaglutide (SEQ ID NO: 7) from Two Fragments Using Several Different Enzyme Variants A stock solution was prepared of 6.06 mM H-Sema(1-11)-OCam-FK—NH$_2$ (H-$^1$His-$^2$Aib-$^3$Glu-$^4$Gly-$^5$Thr-$^6$Phe-$^7$Thr-$^8$Ser-$^9$Asp-$^{10}$Val-$^{11}$Ser-OCam-Phe-Lys-NH$_2$ (SEQ ID NO: 44), prepared according to Protocol 2) and 4.04 mM H-Sema(12-31)—OH(H-$^{12}$Ser-$^{13}$Tyr-$^{14}$Leu-$^{15}$Glu-$^{16}$Gly-$^{17}$Gln-$^{18}$Ala-$^{19}$Ala-$^{20}$Lys(AEEA-AEEA-gamma-Glu-$^{17}$-carboxyheptadecanoyl)-$^{21}$Glu-$^{22}$Phe-$^{23}$Ile-$^{24}$Ala-$^{25}$Trp-$^2$Leu-$^{27}$Val-$^{28}$Arg-$^{29}$Gly-$^{30}$Arg-$^{31}$Gly-OH (SEQ ID NO: 45), prepared according to Protocol 3b), dissolved in a buffer containing 50 mM Tricine, 220 mM potassium trifluoroacetate, 0.25 mg/mL TCEP and the pH was set to 7.9 using 3N aqueous KOH. This stock solution could be aliquoted and stored at −20° C. for further use. To a glass vial, 83.5 μL of the above peptide stock solution was added and the reaction was started by mixing with 16.7 μL of enzyme variant solution (0.15 mg/mL in a buffer containing 25 mM tricine; 125 mM NaCl at pH 7.5). At different time points (usually 0, 15, 30, 60 and 120 min), 5 μL of the reaction mixture was quenched in 250 μL methanesulfonic acid in demineralized water (5 mL/L) to stop any enzyme activity. The quenched samples were analyzed using HPLC/MS. The HPLC peaks referring to the coupling product semaglutide (H-Sema(1-

31)—OH) were integrated and are expressed as HPLC area % in the table below (60 min sample).

| Number | Enzyme variant | H-Sema(1-31)-OH Area % |
|---|---|---|
| 1 | Ptl-84 | 61.84 |
| 2 | Ptl-84 + D99R | 76.92 |
| 3 | Ptl-84 + L96V | 91.33 |
| 4 | Ptl-84 + L96V + D99R | 87.73 |

Clearly, the mutations at L96 and D99 positions had a positive effect on the reaction rate and the coupling efficiency as compared to Ptl-84 reference enzyme.

Example 12: Synthesis of Salmon Calcitonin (SEQ ID NO: 12) from Two Fragments Using an Enzyme Variant A stock solution was prepared of 1.7 mg/ml H-Calci(1-12)-OCam-L-OH(H-$^1$Cys-$^2$Ser-$^3$Asn-$^4$Leu-$^5$Ser-$^6$Thr-$^7$Cys-$^8$Val-$^9$_Leu-$^{10}$Gly-$^{11}$Lys-$^{12}$Leu-OCam-Leu-OH·1TFA (SEQ ID NO: 31), prepared according to Protocol 1) and 1.7 mg/ml H-Calci(13-32)—NH$_2$ (H-$^{13}$Ser-$^{14}$Gln-$^{15}$Glu-$^{16}$Leu-$^{17}$His-$^{18}$Lys-$^{19}$Leu-$^{20}$Gln-$^{21}$Thr-$^{22}$Tyr-$^{23}$Pro-$^{24}$Arg-$^{25}$Thr-$^{26}$Asn-$^{27}$Thr-$^{28}$Gly-$^{29}$Ser-$^{30}$Gly-$^{31}$Thr-$^{32}$Pro-NH$_2$·3TFA (SEQ ID NO: 32), prepared according to Protocol 3a), dissolved in a buffer containing 2 M Guanidine HCl and 50 mM Tricine, 2 mg/mL TCEP and the pH was set to 7.9 using 3N aqueous KOH. This stock solution could be aliquoted and stored at −20° C. for further use. To a glass vial, 70 μL of the above peptide stock solution was added and the reaction was started by mixing with 30 μL of enzyme variant solution (0.1 mg/mL in a buffer containing 25 mM Tricine; 125 mM NaCl at pH 7.5). At different time points (usually 0, 15, 30, 60 and 120 min), 10 μL of the reaction mixture was quenched in 250 μL methanesulfonic acid in demineralized water (5 mL/L) to stop any enzyme activity. The quenched samples were analyzed using HPLC/MS. The HPLC peaks referring to the coupling product salmon calcitonin (H-Cal (1-32)—NH$_2$) were integrated and are expressed as HPLC area % in the table below (60 min sample).

| Enzyme variant | H-Cal(1-32)-NH$_2$ Area % |
|---|---|
| Ptl-79 + D99R | 60.25 |

This example showed that enzyme variants containing mutations according to the invention can efficiently be used for the synthesis of salmon calcitonin.

Example 13: Synthesis of Dasiglucagon (SEQ ID NO: 8) from Two Fragments Using an Enzyme Variant A stock solution was prepared of 3.7 mg/ml H-Dasi(1-8)-OCam-L-OH(H-$^1$His-$^2$Ser-$^3$Gln-$^4$Gly-$^5$Thr-$^6$Phe-$^7$Thr-$^8$Ser-OCam-Leu-OH·2TFA (SEQ ID NO: 15), prepared according to Protocol 1) and 5.9 mg/ml H-Dasi(9-29)—OH (H-$^9$Asp-$^{10}$Tyr-$^{11}$Ser-$^{12}$Lys-$^{13}$Tyr-$^{14}$Leu-$^{15}$Asp-$^{16}$Aib-$^{17}$Ala-$^{18}$Arg-$^{19}$Ala-$^{20}$Glu-$^{21}$Glu-$^{22}$Phe-$^{23}$Val-$^{24}$Lys-$^{25}$Trp-$^{26}$Leu-$^{27}$Glu-$^{28}$Ser-$^{29}$Thr-OH·4TFA (SEQ ID NO: 16), prepared according to Protocol 3a) dissolved in a buffer containing 50 mM Tricine, 220 mM potassium trifluoroacetate, 1 mg/mL TCEP and the pH was set to 7.9 using 3N aqueous KOH. This stock solution could be aliquoted and stored at −20° C. for further use. To a glass vial, 100 μL of the above peptide stock solution was added and the reaction was started by mixing with 2.5 μL of enzyme variant solution (2 mg/mL in a buffer containing 25 mM Tricine; 125 mM NaCl at pH 7.5). At different time points (usually 0, 15, 30, 60 and 120 min), 10 μL of the reaction mixture was quenched in 250 μL methanesulfonic acid in demineralized water (5 mL/L) to stop any enzyme activity. The quenched samples were analyzed using HPLC/MS. The HPLC peaks referring to the coupling product dasiglucagon (H-Dasi(1-29)—OH) were integrated and are expressed as HPLC area % in the table below (60 min sample).

| Enzyme variant | H-Dasi(1-29)-OH Area % |
|---|---|
| Ptl-84 + N156K + E166E + L96I | 80.59 |

This example showed that enzyme variants containing mutations according to the invention can efficiently be used for the synthesis of dasiglucagon.

SEQUENCES

```
SEQ ID NO: 1: wild type gene encoding for subtilisin BPN' amino acids -107 to 275
ENA|K02496|K02496.1 B. Subtilisin BPN' Bacillus amyloliquefaciens
GTGAGAGGCAAAAAAGTATGGATCAGTTTGCTGTTTGCTTTAGCGTTAATCTTTACGATGGCGTTCGGCAGCACA
TCCTCTGCCCAGGCGGCAGGGAAATCAAACGGGGAAAAGAAATATATTGTCGGGTTTAAACAGACAATGAGCAC
GATGAGCGCCGCTAAGAAGAAAGATGTCATTTCTGAAAAAGGCGGGAAAGTGCAAAAGCAATTCAAATATGTAG
ACGCAGCTTCAGCTACATTAAACGAAAAAGCTGTAAAAGAATTGAAAAAAGACCCGAGCGTCGCTTACGTTGAAG
AAGATCACGTAGCACATGCGTACGCGCAGTCCGTGCCTTACGGCGTATCACAAATTAAAGCCCCTGCTCTGCAC
TCTCAAGGCTACACTGGATCAAATGTTAAAGTAGCGGTTATCGACAGCGGTATCGATTCTTCTCATCCTGATTTA
AAGGTAGCAGGCGGAGCCAGCATGGTTCCTTCTGAAACAAATCCTTTCCAAGACAACAACTCTCACGGAACTCA
CGTTGCCGGCACAGTTGCGGCTCTTAATAACTCAATCGGTGTATTAGGCGTTGCGCCAAGCGCATCACTTTACG
CTGTAAAAGTTCTCGGTGCTGACGGTTCCGGCCAATACAGCTGGATCATTAACGGAATCGAGTGGGCGATCGCA
AACAATATGGACGTTATTAACATGAGCCTCGGCGGACCTTCTGGTTCTGCTGCTTTAAAAGCGGCAGTTGATAAA
GCCGTTGCATCCGGCGTCGTAGTCGTTGCGGCAGCCGGTAACGAAGGCACTTCCGGCAGCTCAAGCACAGTG
GGCTACCCTGGTAAATACCCTTCTGTCATTGCAGTAGGCGCTGTTGACAGCAGCAACCAAAGAGCATCTTTCTC
AAGCGTAGGACCTGAGCTTGATGTCATGGCACCTGGCGTATCTATCCAAAGCACGCTTCCTGGAAACAAATACG
GGGCGTACAACGGTACGTCAATGCATCTCCGCACGTTGCCGGAGCGGCTGCTTTGATTCTTTCTAAGCACCC
GAACTGGACAAACACTCAAGTCCGCACGCAGTTTAGAAAACACCACTACAAAACTTGGTGATTCTTTCTACTATGG
AAAAGGGCTGATCAACGTACAGGCGGCAGCTCAGTAA
```

SEQUENCES

SEQ ID NO: 2: wild type subtilisin BPN' (mature)
>SUBT_BACAM Subtilisin BPN' *Bacillus amyloliquefaciens* mature 1 to 275
The amino acids at positions 75-83, 96, 99, 223 and 224 are in bold.
```
AQSVPYGVSQIKAPALHSQGYTGSNVKVAVIDSGIDSSHPDLKVAGGASMVPSETNPFQD          60
NNSHGTHVAGTVAALNNSIGVLGVAPSASLYAVKVLGADGSGQYSWIINGIEWAIANNMDVINMSLGGPS 130
GSAALKAAVDKAVASGWWWVAAAGNEGTSGSSSTVGYPGKYPSVIAVGAVDSSNQRASFS         190
SVGPELDVMAPGVSIQSTLPGNKYGAYNGTSMASPHVAGAAALILSKHPNWTNTQVRSSL         250
ENTTTKLGDSFYYGKGLINVQAAAQ
```

SEQ ID NO: 3: subtilisin BPN' variant according to the invention, with deletion of
the amino acids corresponding to positions 75-83 (Ca$^{2+}$ binding loop), S221
mutation (S221C) and possible L96, D99, A223 and S224 mutations (all four indicated
with X in bold), plus a 6-His tag.
```
AQSVPYGVSQIKAPALHSQGYTGSNVKVAVIDSGIDSSHPDLKVAGGASMVPSETNPFQD          60
NNSHGTHVAGTVAA-VAPSASLYAVKVXGAXGSGQYSWIINGIEWAIANNMDVINMSLGGPS       130 (-9)
GSAALKAAVDKAVASGWWWVAAAGNEGTSGSSSTVGYPGKYPSVIAVGAVDSSNQRASFS         190 (-9)
SVGPELDVMAPGVSIQSTLPGNKYGAYNGTCMXXPHVAGAAALILSKHPNWTNTQVRSSL         250 (-9)
ENTTTKLGDSFYYGKGLINVQAAAQHHHHHH
```

SEQ ID NO: 4-reference enzyme Ptl-84
subtilisin BPN' variant having mutations Q2K, S3C, P5S, S9A, I31L, K43N, M50F,
N62A, A73L, Δ75-83, E156N, G166E, G169A, S188P, F189W, Q206C, N212G, Y217H, N218D,
S221C, M222P, P225N, T254A, and Q271E, plus a 6-His tag.
```
NASHGTHVAGTVLA-VAPSASLYAVKVLGADGSGQYSWIINGIEWAIANNMDVINMSLGGPS        60
GSAALKAAVDKAVASGVVVVAAAGNNGTSGSSSTVEYPAKYPSVIAVGAVDSSNQRAPWS         130 (-9)
SVGPELDVMAPGVSICSTLPGGKYGAHDGTCPASNHVAGAAALILSKHPNWTNTQVRSSL         190 (-9)
ENTATKLGDSFYYGKGLINVEAAAQHHHHHH                                       250 (-9)
```

SEQ ID NO: 5-reference enzyme Ptl-79
subtilisin BPN' variant having mutations Q2K, S3C, P5S, S9A, I31L, K43N, M50F,
A73L, Δ75-83, I107V, E156S, G166S, G169A, S188P, F189W, Q206C, N212G, Y217H, N218S,
S221C, M222P, P225N, T254A and Q271E, plus a 6-His tag.
```
AKCVSYGVAQIKAPALHSQGYTGSNVKVAVLDSGIDSSHPDLNVAGGASFVPSETNPFQD          60
NNSHGTHVAGTVLAVAPSASLYAVKVLGADGSGQYSWVINGIEWAIANNMDVINMSLGGPS        130 (-9)
GSAALKAAVDKAVASGVVVVAAAGNSGTSGSSSTVSYPAKYPSVIAVGAVDSSNQRAPWS         190 (-9)
SVGPELDVMAPGVSICSTLPGGKYGAHSGTCPASNHVAGAAALILSKHPNWTNTQVRSSL         250 (-9)
ENTATKLGDSFYYGKGLINVEAAAQHHHHHH
```

SEQ ID NO: 6-liraglutide
HAEGTFTSDV SSYLEGQAAK EFIAWLVRGR G
Wherein K is Lys(Pal-gamma-Glu)

SEQ ID NO: 7-semaglutide
HXEGTFTSDV SSYLEGQAAK EFIAWLVRGR G
Wherein X is Aib and K is Lys(AEEA-AEEA-gamma-Glu-17-carboxyheptadecanoyl)

SEQ ID NO: 8-dasiglucagon
HSQGTFTSDY SKYLDXARAE EFVKWLEST
Wherein X is Aib

SEQ ID NO: 9-glepaglutide
HGEGTFSSEL ATILDALAAR DFIAWLIATK ITDKKKKKK
wherein C-terminal is amide SEQ ID NO: 10-elsiglutide
HGEGSFSSEL STILDALAAR DFIAWLIATK ITDKKKKKK
wherein C-terminal is amide SEQ ID NO: 11-teriparatide
SVSEIQLMHN LGKHLNSMER VEWLRKKLQD VHNF
wherein N-terminal may be phenylacetylated in the teriparatide precursor SEQ ID NO: 12-salmon calcitonin
CSNLSTCVLG KLSQELHKLQ TYPRTNTGSG TP
wherein Cys1 and Cys7 are linked by a disulfide bond and it has a C-terminal amide SEQ ID NO: 13-bivalirudin
XPRPGGGGNG DFEEIPEEYL
wherein X is D-Phe SEQ ID NO: 14-8-mer model peptide
DFSKLALR
wherein the peptide is acetylated at N-terminal amino acid and has a C-terminal amide

| SEQUENCES |
| --- |

SEQ ID NO: 15-Dasi 1-8
HSQGTFTS
wherein C-terminal is (thio)ester

SEQ ID NO: 16-Dasi 9-29
DYSKYLDXAR AEEFVKWLES T
wherein X is Aib

SEQ ID NO: 17-Dasi 1-9
HSQGTFTSD
wherein C-terminal is (thio)ester

SEQ ID NO: 18-Dasi 10-29
YSKYLDXARA EEFVKWLEST
wherein X is Aib

SEQ ID NO: 19-Dasi 1-10
HSQGTFTSDY
wherein C-terminal is (thio)ester

SEQ ID NO: 20-Dasi 11-29
SKYLDXARA EEFVKWLEST
wherein X is Aib

SEQ ID NO: 21-Glepa 1-11
HGEGTFSSEL A
wherein C-terminal is (thio)ester

SEQ ID NO: 22-Glepa 12-39
TILDALAARD FIAWLIATKI TDKKKKKK

SEQ ID NO: 23-Glepa 1-16
HGEGTFSSEL ATILDA
wherein C-terminal is (thio)ester

SEQ ID NO: 24-Glepa 17-39
LAARD FIAWLIATKI TDKKKKKK

SEQ ID NO: 25-Elsi 1-11
HGEGSFSSEL S
wherein C-terminal is (thio)ester

SEQ ID NO: 26-Elsi 12-39
TILDALAARD FIAWLIATKI TDKKKKKK

SEQ ID NO: 27-Elsi 1-16
HGEGSFSSEL STILDA
wherein C-terminal is (thio)ester

SEQ ID NO: 28-Elsi 17-39
LAARDFIAWL IATKITDKKK KKK

SEQ ID NO: 29-Teri 1-11
SVSEIQLMHN L
wherein C-terminal is (thio)ester

SEQ ID NO: 30-Teri 12-34
GKHLNSMERV EWLRKKLQDV HNF

SEQ ID NO: 31-Calci 1-12
CSNLSTCVLG KL
wherein C-terminal is (thio)ester

SEQ ID NO: 32-Calci 13-32
SQELHKLQTY PRTNTGSGTP
wherein C-terminal might be amide SEQ ID NO: 33-Calci 1-20
CSNLSTCVLG KLSQELHKLQ
wherein C-terminal is (thio)ester SEQ ID NO: 34-Calci 21-32
TYPRTNTGSG TP
wherein C-terminal might be amide

SEQUENCES

SEQ ID NO: 35-Biva 1-10
XPRPGGGGNG
wherein X is D-Phe

SEQ ID NO: 36-Biva 11-20
DFEEIPEEYL

SEQ ID NO: 37-Lira-Sema 1-11
HXEGTFTSDV S
wherein X is Ala or Aib and C-terminal is (thio)ester SEQ ID NO: 38-Lira-Sema 12-31
SYLEGQAAKE FIAWLVRGRG
wherein Lys is selected from Lys, Lys(PG), Lys(gamma-Glu), Lys(Pal-gamma-Glu) and
Lys(AEEA-AEEA-gamma-Glu-17-carboxyheptadecanoyl)

SEQ ID NO: 39-Lira 1-11
HAEGTFTSDV S
wherein C-terminal is -OCam-Phe-Lys-NH$_2$ ester SEQ ID NO: 40-Lira 12-31
SYLEGQAAKE FIAWLVRGRG
wherein Lys is Lys(Pal-gamma-Glu)

SEQ ID NO: 41-model peptide fragment
DFSKL
wherein N-terminal is acetylated and C-terminal is -OCam-Leu-OH ester or OH SEQ ID NO: 42-lira 1-11-1-31
HAEGTFTSDV SHAEGTFTSD VSSYLEGQAA KEFIAWLVRG RG
wherein Lys is Lys(Pal-gamma-Glu)

SEQ ID NO: 43-Teri 1-11 ester
SVSEIQLMHN L
wherein N-terminal is phenylacetylated and C-terminal is -OCam-Leu-OH ester SEQ ID NO: 44-Sema 1-11
HXEGTFTSDV S
wherein X is Aib and C-terminal is -OCam-Phe-Lys-NH$_2$ ester SEQ ID NO: 45-Sema 12-31
SYLEGQAAKE FIAWLVRGRG
wherein Lys is Lys(AEEA-AEEA-gamma-Glu-17-carboxyheptadecanoyl)

SEQ ID NO: 46-liraglutide
HXEGTFTSDV SSYLEGQAAK EFIAWLVRGR G
Wherein X is Ala and Aib
Wherein K is Lys, Lys(PG), Lys(gamma-Glu), Lys(Pal-gamma-Glu) and
Lys(AEEA-AEEA-gamma-Glu-17-carboxyheptadecanoyl)

The invention claimed is:

1. A subtilisin BPN' variant of a homologue of subtilisin BPN', wherein;
   (a) the homologue of subtilisin BPN' has at least 80% sequence identity to SEQ ID NO: 2,
   (b) the homologue of subtilisin BPN' further comprises a deletion of the amino acids at positions 75-83 and a mutation at the amino acid position S221, the mutation being S221C or S221 selenocysteine,
   (c) the subtilisin BPN' variant has at least one further mutation at an amino acid position selected from the group consisting of L96, D99, A223 and S224,
   (d) the amino acid positions are defined according to SEQ ID NO: 2, and
   (e) such variant has ligase and/or cyclase activity with an increased reaction rate and coupling efficiency relative to an otherwise identical homologue of subtilisin BPN' not having a mutation at any of the positions L96, D99, A223 and S224.

2. The subtilisin BPN' variant according to claim 1, comprising one of the following:
   two mutations at amino acid positions selected from the group consisting of L96 and D99; L96 and A223; L96 and S224; D99 and A223; D99 and S224; and, A223 and S224; or
   three mutations at amino acid positions selected from the group consisting of L96, D99 and A223; L96, D99 and S224; L96, A223 and S224; and, D99, A223 and S224; or
   four mutations at amino acid positions L96, D99, A223 and S224.

3. The subtilisin BPN' variant according to claim 1 comprising a mutation at position L96 selected from the group consisting of L96I, L96V, L96 M, L96T, L96C, L96Q, L96A and L96S.

4. The subtilisin BPN' variant according to claim 1, comprising a mutation at position D99 selected from the group consisting of D99R, D99K, D99G, D99F, D99T, D99S, D99N, D99Q, D99Y, D99A, D99 M, D99I, D99V D99H, D99E, D99L and D99W.

5. The subtilisin BPN' variant according to claim 1, comprising a mutation at position A223 selected from the group consisting of A223S and A223G.

6. The subtilisin BPN' variant according to claim 1, comprising a mutation at position S224 selected from the group consisting of S224M, S224Q, S224E, S224H, S224L, S224V and S224I.

7. The subtilisin BPN' variant according to claim 1, wherein the at least one further mutation is selected from the group consisting of L96I, L96V, L96 M, L96T, L96C, L96Q, L96A, L96S, D99R, D99K, D99G, D99F, D99T, D99S, D99N, D990Q D99Y, D99A, D99 M, D99I, D99V, D99H, D99E, D99L, D99W, A223S, A223G, S224M, S224Q, S224E, S224H, S224H, S224L, S224V and S224I.

8. The subtilisin BPN' variant according to claim 1, further comprising a mutation at amino acid position P225 selected from the group consisting of P225N, P225D, P225S, P225C, P225G, P225A, P225T, P225V, P225I, P225L, P225H and P225Q.

9. The subtilisin BPN' variant according to claim 1, further comprising at least 6 mutations at amino acid positions selected from the group consisting of Q2, S3, P5, S9, I31, K43, M50, A73, G169, S188, Q206, N212, T254 and Q271.

10. The subtilisin BPN' variant of a homologue of subtilisin BPN' according to claim 9, wherein the at least six further mutations are selected from the group consisting of Q2K, S3C, P5S, S9A, I31L, K43N, M50F, A73L, G169A, S188P, Q206C, N212G, T254A and Q271E.

11. The subtilisin BPN' variant according to claim 1, further comprising at least one mutation at an amino acid position selected from the group consisting of S33, N62, E156, G166, Y217, N218 and F189.

12. The subtilisin BPN' variant of a homologue of subtilisin BPN' according to claim 11, wherein the at least one further mutation is selected from the group consisting of S33T, N62A, N62R, N62K, E156S, E156N, E156K, E156R, G166S, G166E, G166D, Y217L, Y217H, Y217R, N218S, N218D and F189W.

13. The subtilisin BPN' variant according to claim 1, further comprising at least one mutation at the amino acid positions M222 and Y217, or pairs of mutations, wherein the single mutation is selected from the group consisting of M222P, M222G, M222H, Y217H, Y217G, Y217F, Y217L, and Y217R, and wherein the pairs of mutations are selected from the group consisting of M222P and Y217H; M222P and Y217G; M222G and Y217F; M222G and Y217G; M222G and Y217L; and, M222H and Y217R.

14. The subtilisin BPN' variant according to claim 1, comprising the mutations Q2K, S3C, P5S, S9A, I31L, K43N, M50F, N62A, A73L, E156K, G166D, G169A, S188P, F189W, Q206C, N212G, Y217R, N218D, M222H, P225N, T254A, Q271E and a combination of mutations selected from the group consisting of L96I and D99R; L96I and D99K; L96I and A223S; L96I and S224V; L96I, A223S and S224V; L96I, D99R and S224V; L96I, D99R, A223S and S224V; L96I, D99K and A223S; L96I, D99K and S224V; and, L96I, D99K, A223S and S224V.

15. The subtilisin BPN' variant according to claim 1, characterized by having at least 85% identity to SEQ ID NO: 2.

16. The subtilisin BPN' variant of a homologue of subtilisin BPN' according to claim 1, wherein the subtilisin BPN' variant has a combination of further mutations selected from the group consisting of L96V and D99R; L96I and D99R; L96I and D99K: L96I and A223S; L96I and S224V; L96V, D99R and A223S; L96V, D99R and S224V; L96I, D99R and A223S; L96I, D99R and S224V; L96I, D99K and A223S; L96I, A223S and S224V; L96I, D99K and S224V; L96V, D99R, A223S and S224V; L96I, D99R, A223S and S224V; L96V, D99K, A223S and S224V; and, L96I, D99K, A223S and S224V.

17. The subtilisin BPN' variant of a homologue of subtilisin BPN' according to claim 16, wherein the subtilisin BPN' variant has a combination of further mutations selected from the group consisting of L96I, D99R and S224V; L96I, D99R, A223S and S224V; and L96I, D99K and S224V.

18. A subtilisin BPN' variant of a homologue of subtilisin BPN',
wherein;
(a) the homologue of subtilisin BPN' has at least 80% sequence identity to SEQ ID NO: 2,
(b) the homologue of subtilisin BPN' further comprises a deletion of the amino acids at positions 75-83 and a mutation at the amino acid position S221, the mutation being S221C or S221 selenocysteine,
(c) the subtilisin BPN' variant has at least one further mutation at an amino acid position selected from the group consisting of L96, D99, A223 and S224,
(d) the amino acid positions are defined according to SEQ ID NO: 2, and
(e) such variant has ligase and/or cyclase activity with an increased reaction rate and coupling efficiency relative to an otherwise identical homologue of subtilisin BPN' not having a mutation at any of the positions L96, D99, A223 and S224; and
wherein the mutation at position L96 is selected from the group consisting of L96I, L96V, L96 M, L96T, L96C, L96Q, L96A and L96S;
wherein the mutation at position L96 is selected from the group consisting of D99R, D99K, D99G, D99F, D99T, D99S, D99N, D99Q, D99Y, D99A, D99M, D99I, D99V, D99H, D99E, D99L and D99W;
wherein the mutation at position A223 is selected from the group consisting of A223S and A223G; and
wherein the mutation at position S224 is selected from the group consisting of S224M, S224Q, S224E, S224H, S224L, S224V and S224I.

19. A method for enzymatically synthesizing a peptide comprising coupling (a) a peptide C-terminal (thio)ester with (b) a peptide nucleophile having an N-terminal unprotected amine, wherein the coupling is performed in an aqueous solution, and wherein the coupling is catalyzed by a subtilisin BPN' variant of a homologue of subtilisin BPN', wherein:
(i) the homologue of subtilisin BPN' has at least 80% sequence identity to SEO ID NO: 2,
(ii) the homologue of subtilisin BPN' further comprises a deletion of the amino acids at positions 75-83 and a mutation at the amino acid position S221, the mutation being S221C or S221 selenocysteine,
(iii) the subtilisin BPN' variant has at least one further mutation at an amino acid position selected from the group consisting of L96, D99, A223 and S224,
(iv) the amino acid positions are defined according to SEO ID NO: 2, and
(v) such variant has ligase and/or cyclase activity with an increased reaction rate and coupling efficiency relative to an otherwise identical homologue of subtilisin BPN' not having a mutation at any of the positions L96, D99, A223 and S224.

20. The method according to claim 19, wherein the synthesized peptide is selected from the group consisting of liraglutide, semaglutide, dasiglucagon, teduglutide, glepaglutide, elsiglutide, teriparatide, salmon calcitonin, bivalirudin and their analogues.

21. The method according to claim 19, for synthesizing a peptide comprising the sequence of dasiglucagon (SEQ ID NO: 8), comprising a step of coupling:
either
(a) a peptide C-terminal (thio)ester comprising a first peptide fragment with the sequence His-Ser-Gln-Gly-Thr-Phe-Thr-Ser-(thio)ester (SEQ ID NO: 15); with
(b) a peptide nucleophile fragment having an N-terminally unprotected amine comprising a second peptide fragment with the sequence H-Asp-Tyr-Ser-Lys-Tyr-Leu-Asp-Aib-Ala-Arg-Ala-Glu-Glu-Phe-Val-Lys-Trp-Leu-Glu-Ser-Thr (SEQ ID NO: 16); or
(c) a peptide C-terminal (thio)ester comprising a first peptide fragment with the sequence His-Ser-Gln-Gly-Thr-Phe-Thr-Ser-Asp(thio)ester (SEQ ID NO: 17); with
(d) a peptide nucleophile fragment having an N-terminally unprotected amine comprising a second peptide fragment with the sequence H-Tyr-Ser-Lys-Tyr-Leu-Asp-Aib-Ala-Arg-Ala-Glu-Glu-Phe-Val-Lys-Trp-Leu-Glu-Ser-Thr (SEQ ID NO: 18); or
(e) a peptide C-terminal (thio)ester comprising a first peptide fragment with the sequence His-Ser-Gln-Gly-Thr-Phe-Thr-Ser-Asp-Tyr(thio)ester (SEQ ID NO: 19); with
(f) a peptide nucleophile fragment having an N-terminally unprotected amine comprising a second peptide fragment with the sequence H-Ser-Lys-Tyr-Leu-Asp-Aib-Ala-Arg-Ala-Glu-Glu-Phe-Val-Lys-Trp-Leu-Glu-Ser-Thr (SEQ ID NO: 20);
or for synthesizing a peptide comprising the sequence of glepaglutide (SEQ ID NO: 9), comprising a step of coupling:
either
(a) a peptide C-terminal (thio)ester comprising a first peptide fragment with the sequence His-Gly-Glu-Gly-Thr-Phe-Ser-Ser-Glu-Leu-Ala-(thio)ester (SEQ ID NO: 21); with
(b) a peptide nucleophile fragment having an N-terminally unprotected amine comprising a second peptide fragment with the sequence H-Thr-Ile-Leu-Asp-Ala- Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys (SEQ ID NO: 22); or (c) a peptide C-terminal (thio)ester comprising a first peptide fragment with the sequence His-Gly-Glu-Gly-Thr-Phe-Ser-Ser-Glu-Leu-Ala-Thr-Ile-Leu-Asp-Ala-(thio)ester (SEQ ID NO: 23); with (d) a peptide nucleophile fragment having an N-terminally unprotected amine comprising a second peptide fragment with the sequence H-Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys (SEQ ID NO: 24);

or for synthesizing a peptide comprising the sequence of elsiglutide (SEQ ID NO: 10), comprising a step of coupling:

either (a) a peptide C-terminal (thio)ester comprising a first peptide fragment with the sequence His-Gly-Glu-Gly-Ser-Phe-Ser-Ser-Glu-Leu-Ser-(thio)ester (SEQ ID NO: 25); with (b) a peptide nucleophile fragment having an N-terminally unprotected amine comprising a second peptide fragment with the sequence H-Thr-Ile-Leu-Asp-Ala-Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys (SEQ ID NO: 26);

or (c) a peptide C-terminal (thio)ester comprising a first peptide fragment with the sequence His-Gly-Glu-Gly-Ser-Phe-Ser-Ser-Glu-Leu-Ser-Thr-Ile-Leu-Asp-Ala-(thio)ester (SEQ ID NO: 27); with (d) a peptide nucleophile fragment having an N-terminally unprotected amine comprising a second peptide fragment with the sequence H-Leu-Ala-Ala-Arg-Asp-Phe-Ile-Ala-Trp-Leu-Ile-Ala-Thr-Lys-Ile-Thr-Asp-Lys-Lys-Lys-Lys-Lys-Lys (SEQ ID NO: 28);

or for synthesizing a peptide comprising the sequence of teriparatide (SEQ ID NO: 11), comprising a step of coupling:

(a) a peptide C-terminal (thio)ester comprising a first peptide fragment with the sequence Ser-Val-Ser-Glu-Ile-Gln-Leu-Met-His-Asn-Leu-(thio)ester (SEQ ID NO: 29); with (b) a peptide nucleophile fragment having an N-terminally unprotected amine comprising a second peptide fragment with the sequence H-Gly-Lys-His-Leu-Asn-Ser-Met-Glu-Arg-Val-Glu-Trp-Leu-Arg-Lys-Lys-Leu-Gln-Asp-Val-His-Asn-Phe (SEQ ID NO: 30);

or for synthesizing a peptide comprising the sequence of salmon calcitonin (SEQ ID NO: 12), comprising a step of coupling:

either (a) a peptide C-terminal (thio)ester comprising a first peptide fragment with the sequence Cys-Ser-Asn-Leu-Ser-Thr-Cys-Val-Leu-Gly-Lys-Leu-(thio)ester (SEQ ID NO: 31); with (b) a peptide nucleophile fragment having an N-terminally unprotected amine comprising a second peptide fragment with the sequence H-Ser-Gln-Glu-Leu-His-Lys-Leu-Gln-Thr-Tyr-Pro-Arg-Thr-Asn-Thr-Gly-Ser-Gly-Thr-Pro (SEQ ID NO: 32); or (c) a peptide C-terminal (thio)ester comprising a first peptide fragment with the sequence Cys-Ser-Asn-Leu-Ser-Thr-Cys-Val-Leu-Gly-Lys-Leu-Ser-Gln-Glu-Leu-His-Lys-Leu-Gln-(thio)ester (SEQ ID NO: 33); with (d) a peptide nucleophile fragment having an N-terminally unprotected amine comprising a second peptide fragment with the sequence H-Thr-Tyr-Pro-Arg-Thr-Asn-Thr-Gly-Ser-Gly-Thr-Pro (SEQ ID NO: 34);

or for synthesizing a peptide comprising the sequence of bivalirudin (SEQ ID NO: 13), comprising a step of coupling:

(a) a peptide C-terminal (thio)ester comprising a first peptide fragment with the sequence D-Phe-Pro-Arg-Pro-Gly-Gly-Gly-Gly-Asn-Gly-(thio)ester (SEQ ID NO: 35); with (b) a peptide nucleophile fragment having an N-terminally unprotected amine comprising a second peptide fragment with the sequence H-Asp-Phe-Glu-Glu-Ile-Pro-Glu-Glu-Tyr-Leu (SEQ ID NO: 36);

or for synthesizing liraglutide or semaglutide comprising the sequence His-W-Glu-Gly-Thr-Phe-Thr-Ser-Asp-Val-Ser-Ser-Tyr-Leu-Glu-Gly-Gln-Ala-Ala-Z-Glu-Phe-Ile-Ala-Trp-Leu-Val-Arg-Gly-Arg-Gly, wherein W is Ala and Z is selected from the group consisting of Lys, Lys(PG), Lys(γ-Glu), and Lys(Pal-γ-Glu) for synthesizing liraglutide (SEQ ID NO: 6), or W is Aib and Z is selected from the group consisting of Lys, Lys(PG), and Lys(AEEA-AEEA-γ-Glu-17-carboxyheptadecanoyl) for synthesizing semaglutide (SEQ ID NO: 7), and PG is a protecting group of Lys side-chain amino group;

the method comprising a step of coupling:

(a) a peptide C-terminal (thio)ester comprising a first peptide fragment with the sequence His-W-Glu-Gly-Thr-Phe-Thr-Ser-Asp-Val-Ser-(thio)ester (SEQ ID NO: 37); with (b) a peptide nucleophile fragment having an N-terminally unprotected amine comprising a second peptide fragment with the sequence H-Ser-Tyr-Leu-Glu-Gly-Gln-Ala-Ala-Z-Glu-Phe-Ile-Ala-Trp-Leu-Val-Arg-Gly-Arg-Gly-OH (SEQ ID NO: 38).

22. The method according to claim 19 wherein the subtilisin BPN' variant comprises one of the following:

one mutation at an amino acid position selected from the group consisting of L96, D99, A223 and S224; or two mutations at amino acid positions selected from the group consisting of L96 and D99; L96 and A223; L96 and S224; D99 and A223; D99 and S224; and, A223 and S224; or three mutations at amino acid positions selected from the group consisting of L96, D99 and A223; L96, D99 and S224; L96, A223 and S224; and, D99, A223 and S224; or four mutations at amino acid positions L96, D99, A223 and S224.

* * * * *